United States Patent
Shokooh et al.

(10) Patent No.: US 9,645,558 B2
(45) Date of Patent: May 9, 2017

(54) DYNAMIC PARAMETER TUNING USING PARTICLE SWARM OPTIMIZATION

(71) Applicant: OPERATION TECHNOLOGY, INC., Irvine, CA (US)

(72) Inventors: Farrokh Shokooh, Laguna Beach, CA (US); Ahmed Yousuf Saber, Lake Forest, CA (US)

(73) Assignee: OPERATION TECHNOLOGY, INC., Irvine, CA (US)

( * ) Notice: Subject to any disclaimer, the term of this patent is extended or adjusted under 35 U.S.C. 154(b) by 546 days.

(21) Appl. No.: 14/042,539

(22) Filed: Sep. 30, 2013

(65) Prior Publication Data

US 2014/0172125 A1    Jun. 19, 2014

Related U.S. Application Data

(60) Provisional application No. 61/707,911, filed on Sep. 29, 2012.

(51) Int. Cl.
*G05B 13/02* (2006.01)
*G05B 13/04* (2006.01)

(52) U.S. Cl.
CPC .................... *G05B 13/04* (2013.01)

(58) Field of Classification Search
CPC ...................................... G05B 13/04
USPC ............................................ 700/29
See application file for complete search history.

(56) References Cited

U.S. PATENT DOCUMENTS

2011/0125684 A1* 5/2011 Al-Duwaish ........ G06N 3/0481
                                                                   706/19
2011/0257800 A1   10/2011 Al-Hamouz et al.

OTHER PUBLICATIONS

Valle et al. "Particle Swarm Optimization: Basic Concepts, Variants and Applications in Power Systems" from "IEEE Transactions on Evolutionary Computation, vol. 12, No. 2, Apr. 2008".*
Kiran et al. "Online Training of a Generalized Neuron with Particle Swarm Optimization" from "2006 International Joint Conference on Neural Networks, Jul. 16-21, 2006".*
Abido "Optimal Design of Power—System Stabilizers Using Particle Swarm Optimization" from "IEEE Transactions on Energy Conversion, vol. 17, No. 3, Sep. 2002".*
Bhasker, R., "Nonlinear Parameter Estimation of Excitation Systems", IEEE Transactions on Power Systems, 2000, vol. 15, No. 4, pp. 1225-1231.

(Continued)

*Primary Examiner* — Christopher E Everett
*Assistant Examiner* — Yuhui R Pan
(74) *Attorney, Agent, or Firm* — One LLP

(57) ABSTRACT

Dynamic parameter tuning using particle swarm optimization is disclosed. According to one embodiment, a system for dynamically tuning parameters comprising a control unit; and a system for receiving parameters tuned by the control unit. The control unit receives as input a model selection and definitions, and dynamically tunes a value for each parameter by using a modified particle swarm optimization method. The modified particle swarm optimization method comprises moving particle locations based on a particle's inertia, experience, global knowledge, and a tuning factor. The control unit outputs the dynamically tuned value for each parameter.

10 Claims, 22 Drawing Sheets

(56) References Cited

OTHER PUBLICATIONS

Cepeda, J. C., et al., "Identification of Dynamic Equivalents based on Heuristic Optimization for Smart Grid Applications", IEEE World Congress on Computational Intelligence, Brisbane, Australia, 2012, pp. 1-8.
Chen, R., et al., "A Two-Level Online Parameter Identification Approach", IEEE PES General Meeting, 2013, Vancouver, British Colombia, Canada, pp. 1-6.
Filho, E.B.S., et al., "Parameter Estimation for Induction Machines via Non-Linear Least Squares Method", Proc. Int. Conf. Industrial Electronics, Control and Instrumentation (IECON), 1991, vol. 1, pp. 639-643.
Gaing, Z.L., "Closure to "Discussion of 'Particle Swarm Optimization to Solving the Economic Dispatch Considering the Generator Constraints'"", IEEE Transactions on Power Systems, 2004, vol. 19, No. 4, pp. 2122-2123.
Kennedy, J., et al., "Particle Swarm Optimization", IEEE Int. Conf. on Neural Networks, 1995, pp. 1942-1948.
Kennedy, J., et al., "A Discrete Binary Version of the Particle Swarm Algorithm", IEEE Int. Conf. on Systems, Man, and Cybernetics, 1997, pp. 4104-4109.
Liaw, C. M., et al., "Parameter Estimation of Excitation Systems from Sampled Data", IEEE Transactions on Automatic Control, 1992, vol. 37, No. 5, pp. 663-666.
Liu, C.S., et al., "Identification of Exciter Constants Using a Coherence Function Based Weighted Least Squares Approach", IEEE Transactions on Energy Conversion, 1993, vol. 8, No. 3, pp. 460-467.
Saber, A. Y., et al., "Unit commitment computation by fuzzy adaptive particle swarm optimization", IET Gener. Transm. Distrib., 2007, vol. 1, No. 3, pp. 456-465.
Wang, J.C., et al., "Identification of Excitation System Models Based on On-line Digital Measurements", IEEE Transactions on Power Systems, 1995, vol. 10, No. 3, pp. 1286-1293.
Wei, D., et al., "Identification of Electrical Parameters in a Power Network Using Genetic Algorithms and Transient Measurements", 13th International Power Electronics and Motion Control Conference (PEMC), 2008, pp. 1716-1721.

\* cited by examiner

DYNAMIC PARAMETER TUNING USING PARTICLE SWARM OPTIMIZATION

The present application claims the benefit of priority to U.S. Provisional Patent Application Ser. No. 61/707,911 filed Sep. 29, 2012, titled "Dynamic Parameter Tuning Using Particle Swarm Optimization," the disclosure of which is hereby incorporated herein by reference in its entirety.

FIELD

The embodiments relate generally to control systems, and more particularly to dynamic parameter tuning using particle swarm optimization.

BACKGROUND

Dynamic parameter tuning (DPT) tunes parameters of dynamic models. Given transfer function model structures (e.g., exciters, governors, power system stabilizers, generators, wind turbines, electrical machines, FACTS devices, controllers), typical values of model parameters, power system network (if available), and field recorded data using smart sensor devices like PMUs, DPT tunes parameters of dynamic models (e.g., gains, transfer functions, integrators, derivative, time constants, limiters, saturation constants, dead zones, delay) where deviation between the recorded data and the calculated output of the model using the tuned parameters is minimum. In other words, DPT can be used to estimate the values of the parameters that make the controllers respond as similarly as possible to a field measured response (i.e. measurements from a staged test or field recorded disturbance). The tuning response can be accomplished by using an iterative approach that automatically adjusts the tunable settings or parameters in the model to make the controller response match that of field recorded data. This process may also be known as automatic model validation parameter tuning.

A phasor measurement unit (PMU) or synchrophasor is a device that measures the electrical waves on an electricity grid, using a common time source for synchronization. A phasor is a complex number that represents both the magnitude and phase angle of the sine waves found in electricity. Time synchronization allows synchronized real-time measurements of multiple remote measurement points on the grid. In power engineering, these are also commonly referred to as synchrophasors and are considered one of the most important measuring devices in the future of power systems. A PMU can be a dedicated device, or the PMU function can be incorporated into a protective relay or other device. DPT can use the data from PMUs.

DPT is a complex constraint optimization problem in a huge complex multi-dimensional search space because the above mentioned dynamic systems are highly non-linear with limiters (saturations) and are highly sensitive to parameters; they have multiple inputs/outputs (multi-objective) and multiple solutions exist.

Particle swarm optimization (PSO) is a promising optimization method for engineering applications today. It is a swarm based iterative optimization method. Each potential solution, called a particle, flies in a multi-dimensional search space with a velocity, and the velocity is dynamically adjusted according to the flying experience of the particle and other particles.

The least square method is typically used for parameter identification (PI). Few products are available in the market for PI using mainly least square method and not a single product is available for parameter tuning (PT) where any intelligent optimization method is used.

It is very difficult and time consuming to tune the dynamic model parameters from time domain input and output values (curves or data points) because of complex relationships and high sensitivity. It is a complex constraint optimization problem in complex search space with thousands of data points including limits and saturations. Practical control systems have many complex control blocks with saturation limits (gains, transfer functions, integrators, derivative, time constants, limiters, saturation constants, dead zones, delay, etc.), and thus the traditional least square method is not suitable mainly for DPT where balance between local and global search is very important for fine tuning.

SUMMARY

Dynamic parameter tuning using modified particle swarm optimization is disclosed. According to one embodiment, a system for dynamically tuning parameters comprising a control unit; and a system for receiving parameters tuned by the control unit. The control unit receives as input a model selection and definitions, and dynamically tunes a value for each parameter by using a modified particle swarm optimization method. The modified particle swarm optimization method comprises moving particle locations based on a particle's inertia, experience, global knowledge, and a tuning factor. The control unit outputs the dynamically tuned value for each parameter.

The systems, methods, features and advantages of the invention will be or will become apparent to one with skill in the art upon examination of the following figures and detailed description. It is intended that all such additional methods, features and advantages be included within this description, be within the scope of the invention, and be protected by the accompanying claims. It is also intended that the invention is not limited to require the details of the example embodiments.

BRIEF DESCRIPTION

The accompanying drawings, which are included as part of the present specification, illustrate the presently preferred embodiment and, together with the general description given above and the detailed description of the preferred embodiment given below, serve to explain and teach the principles of the present invention.

Figure 9A:
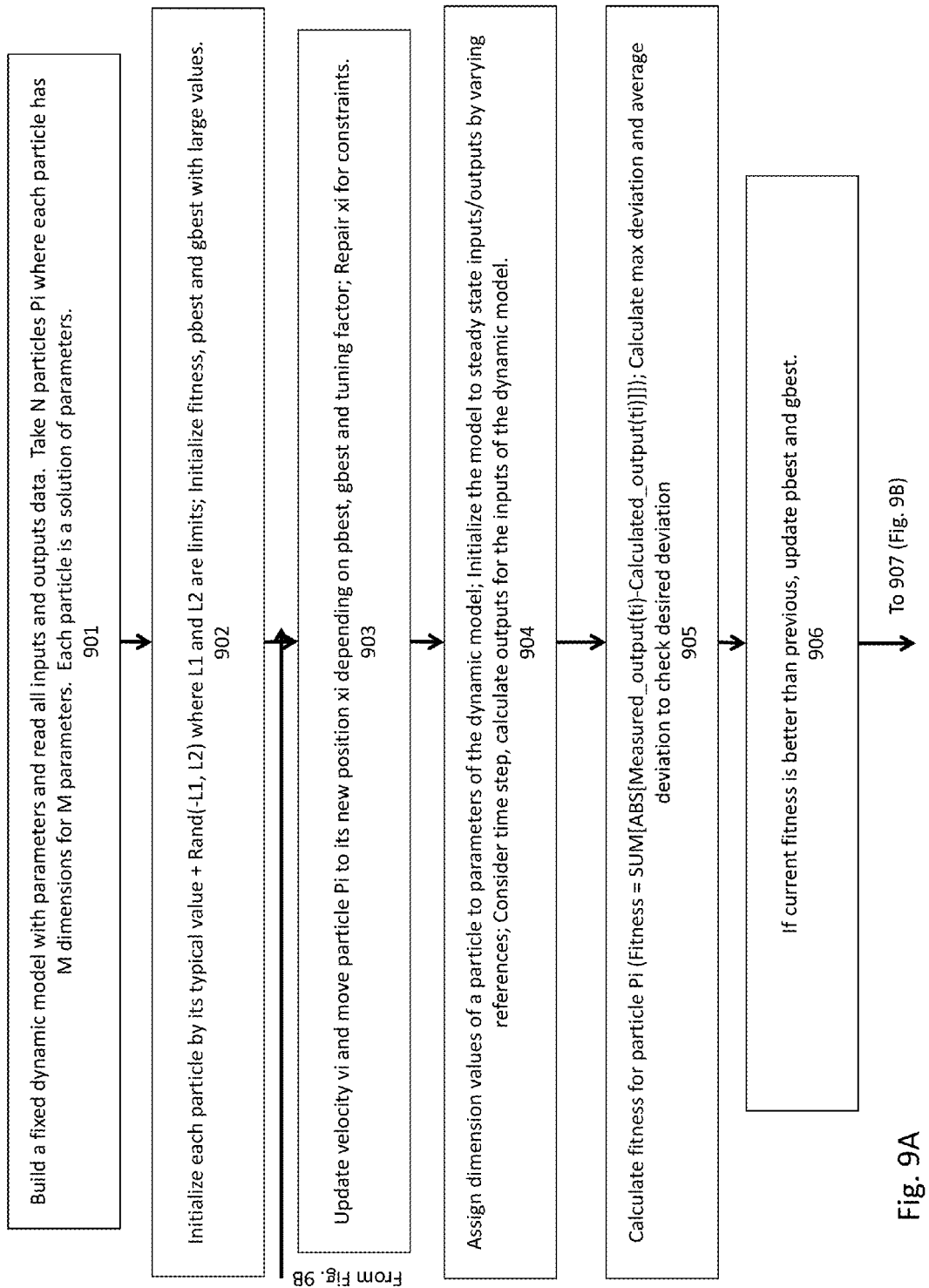

FIGS. 9A and B illustrate yet another exemplary DPT calculation process using MPSO for use with the present system, according to one embodiment.

Figure 10:
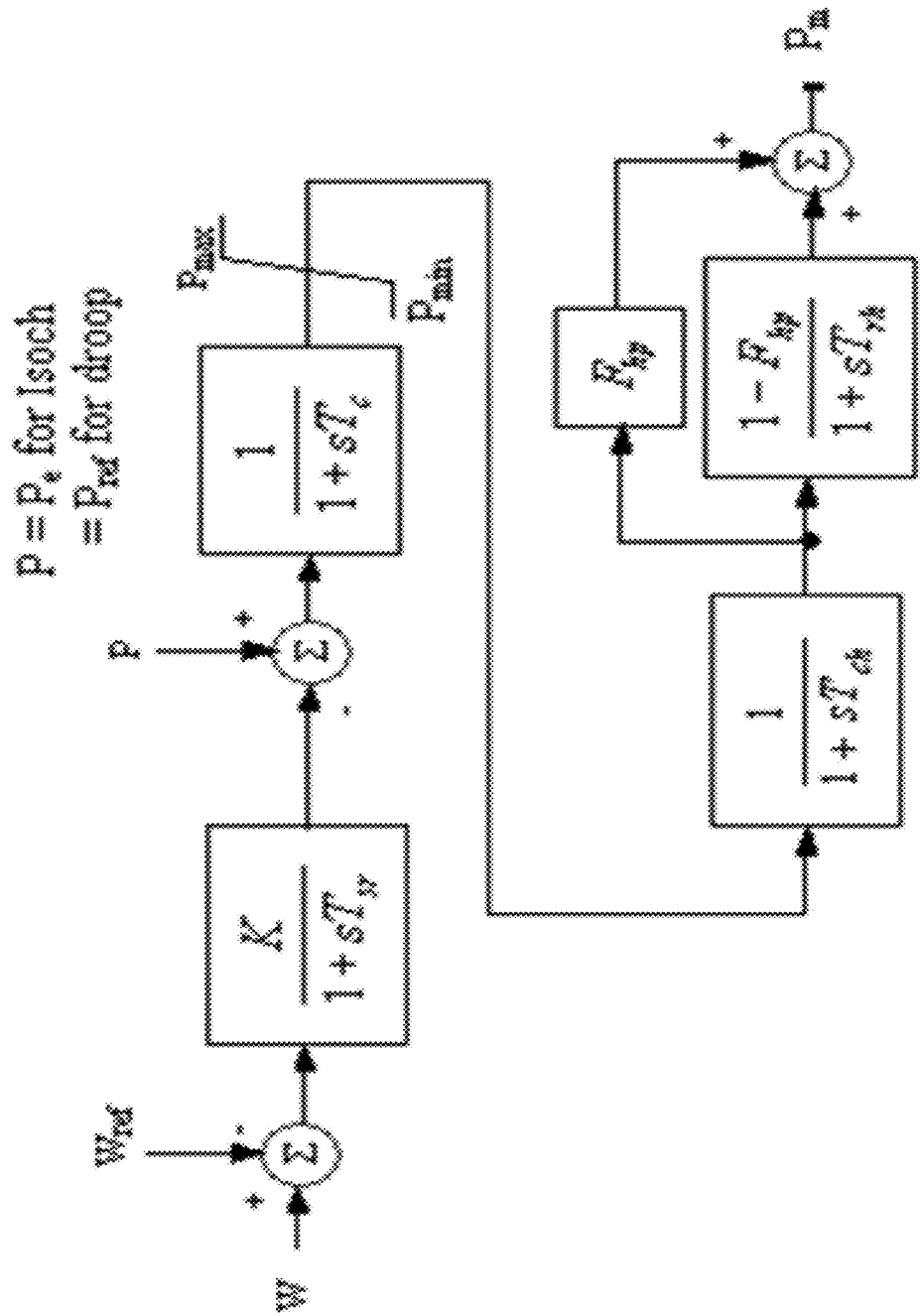

FIG. 10 illustrates an exemplary ST type governor used for simulation, according to one embodiment.

Figure 11:
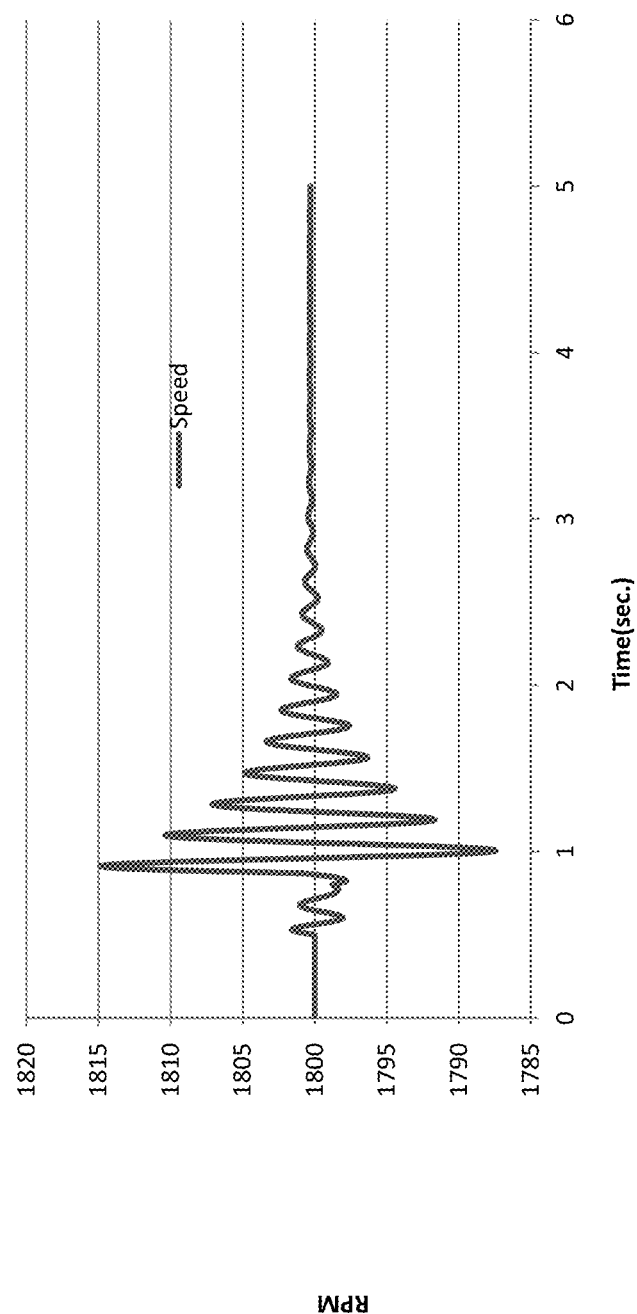

FIG. 11 illustrates exemplary speed over time for the exemplary ST type governor depicted in FIG. 10.

Figure 12:
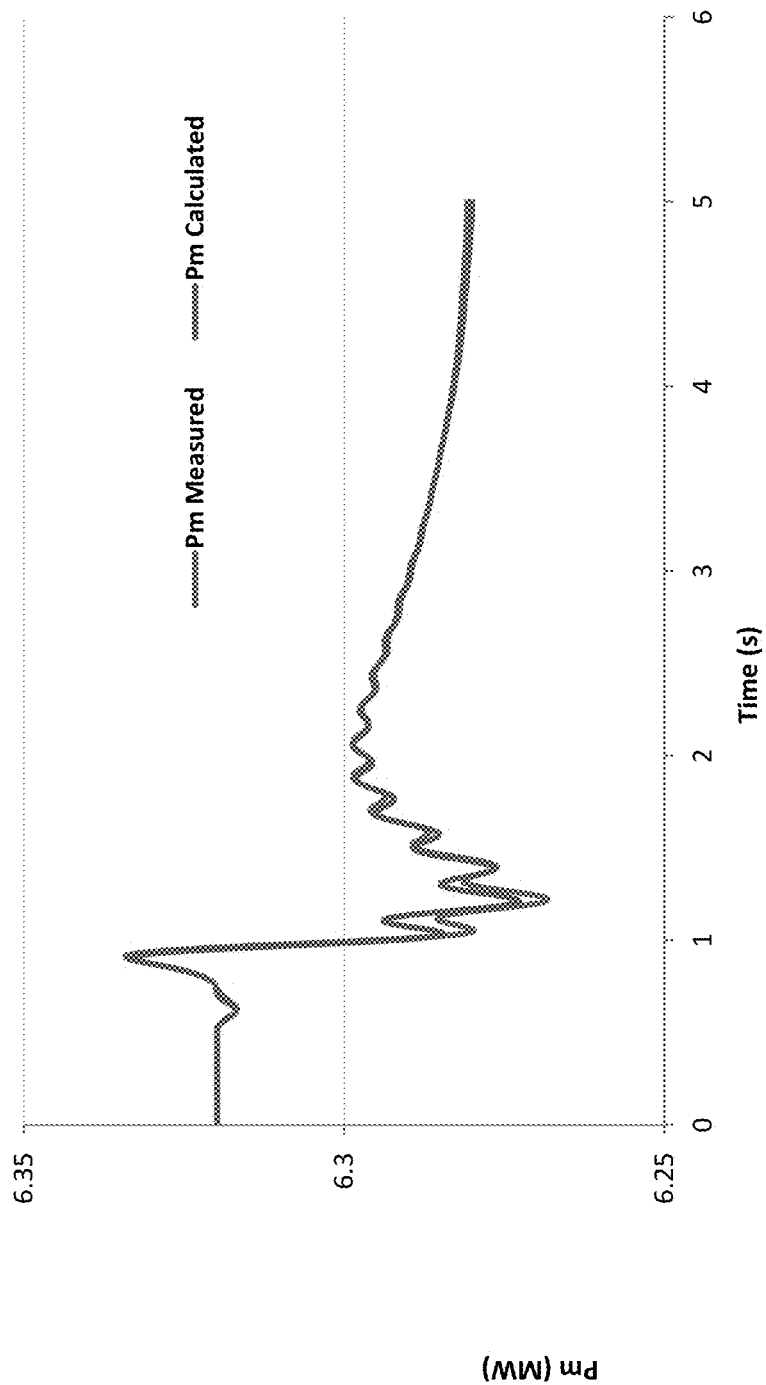

FIG. 12 illustrates a comparison of mechanical power output for the exemplary ST type governor depicted in FIG. 10.

Figure 13:
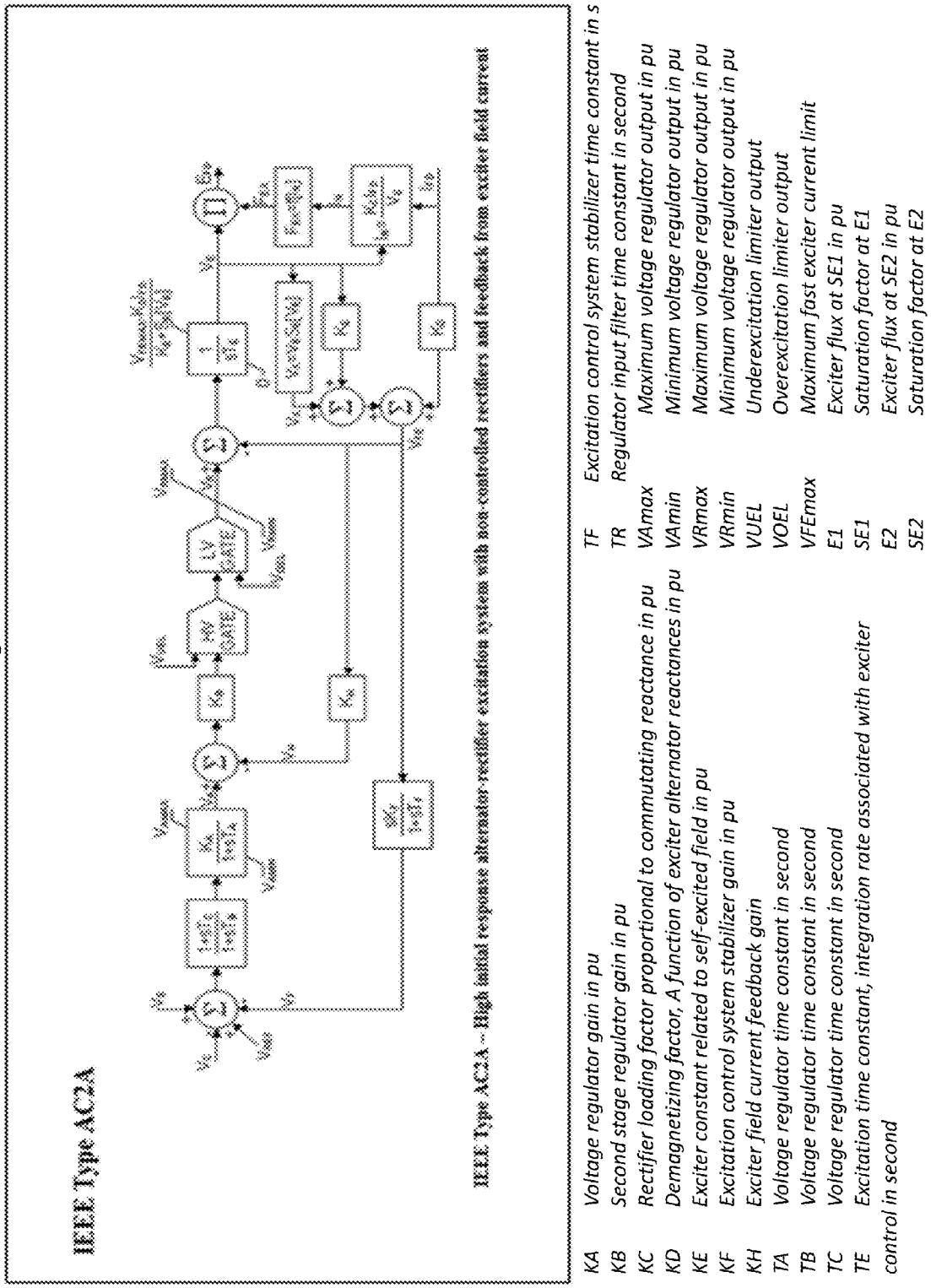

FIG. 13 illustrates an IEEE type AC2A exciter used for simulation, according to one embodiment.

Figure 14:
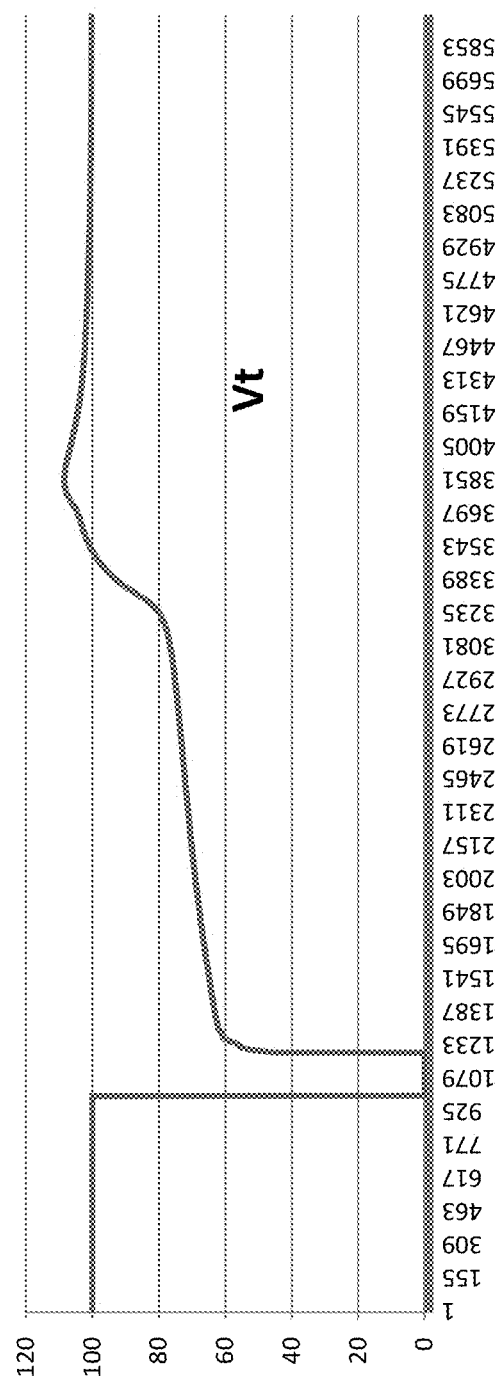

FIG. 14 illustrates Vt for the exemplary IEEE type AC2A exciter illustrated in FIG. 13.

Figure 15:
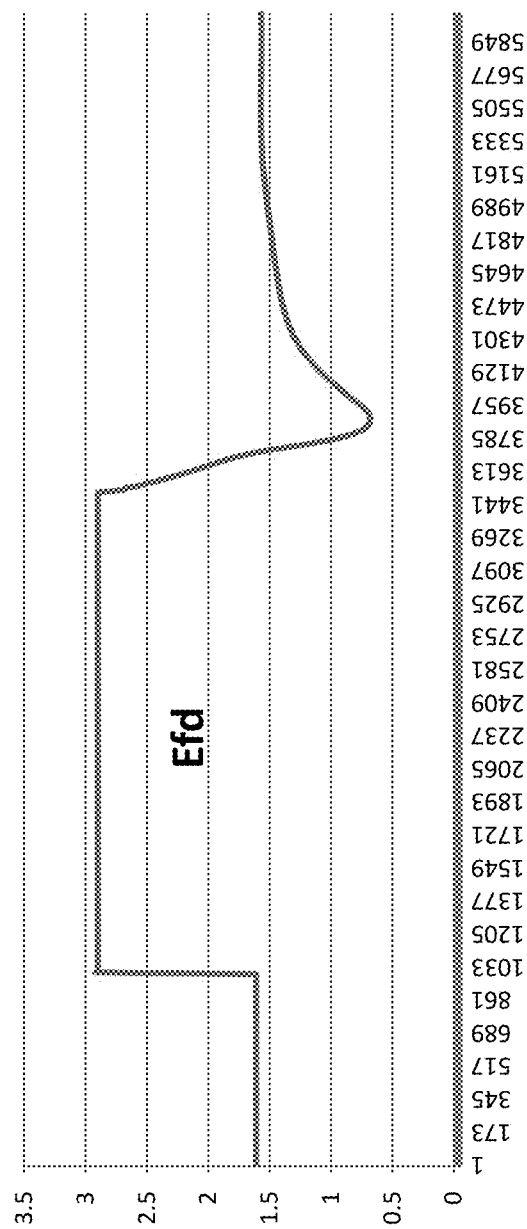

FIG. 15 illustrates Efd for the IEEE type AC2A exciter illustrated in FIG. 13.

Figure 16:
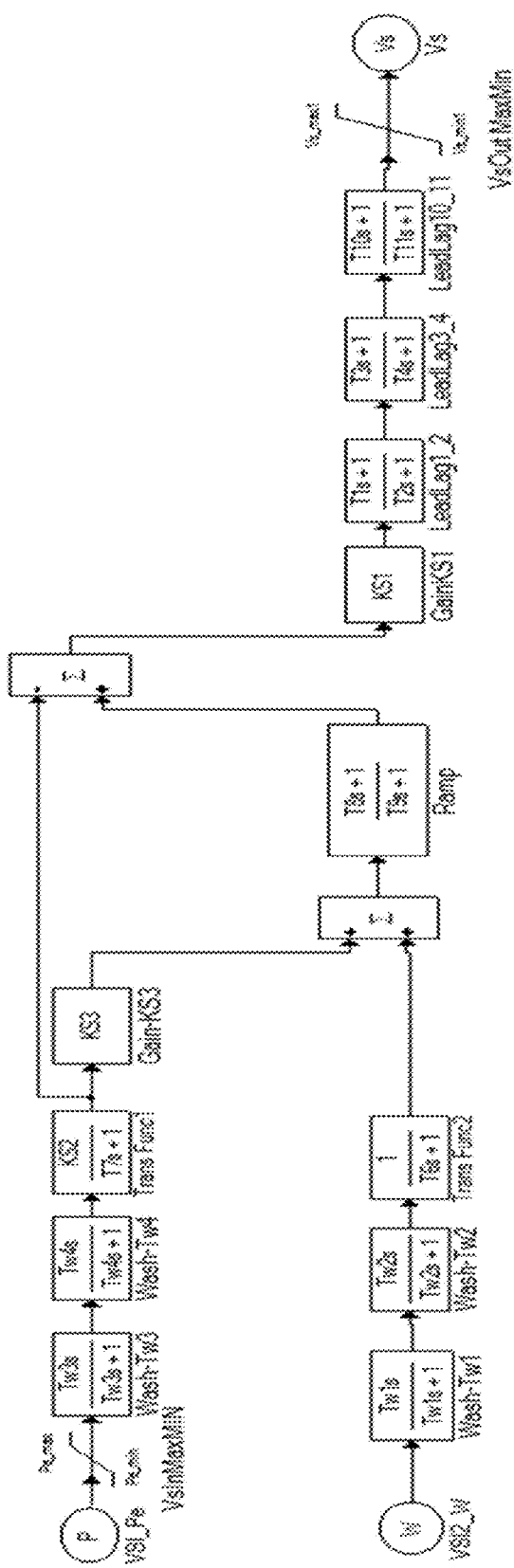

FIG. 16 illustrates an IEEE PSS2B dual-input power system stabilizer used for simulation, according to one embodiment.

Figure 17A:
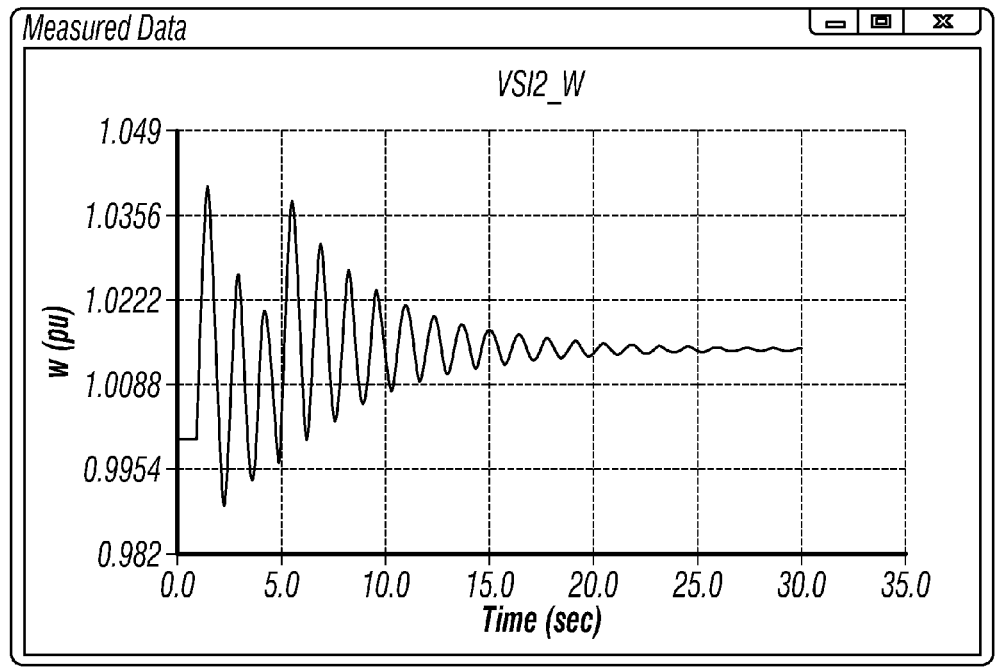
Figure 17B:
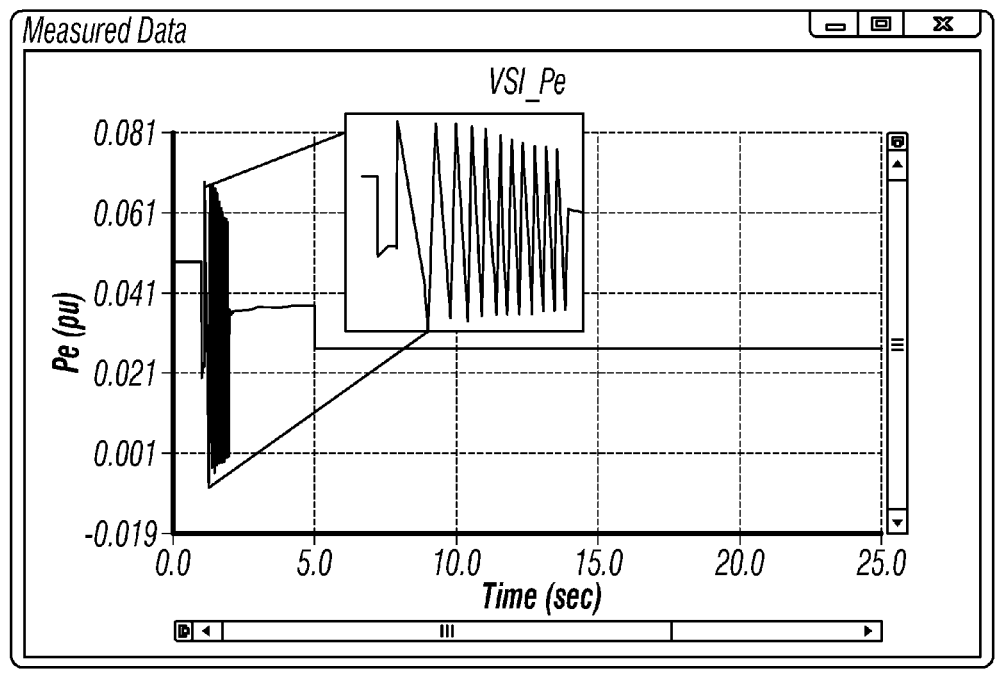
Figure 17C:
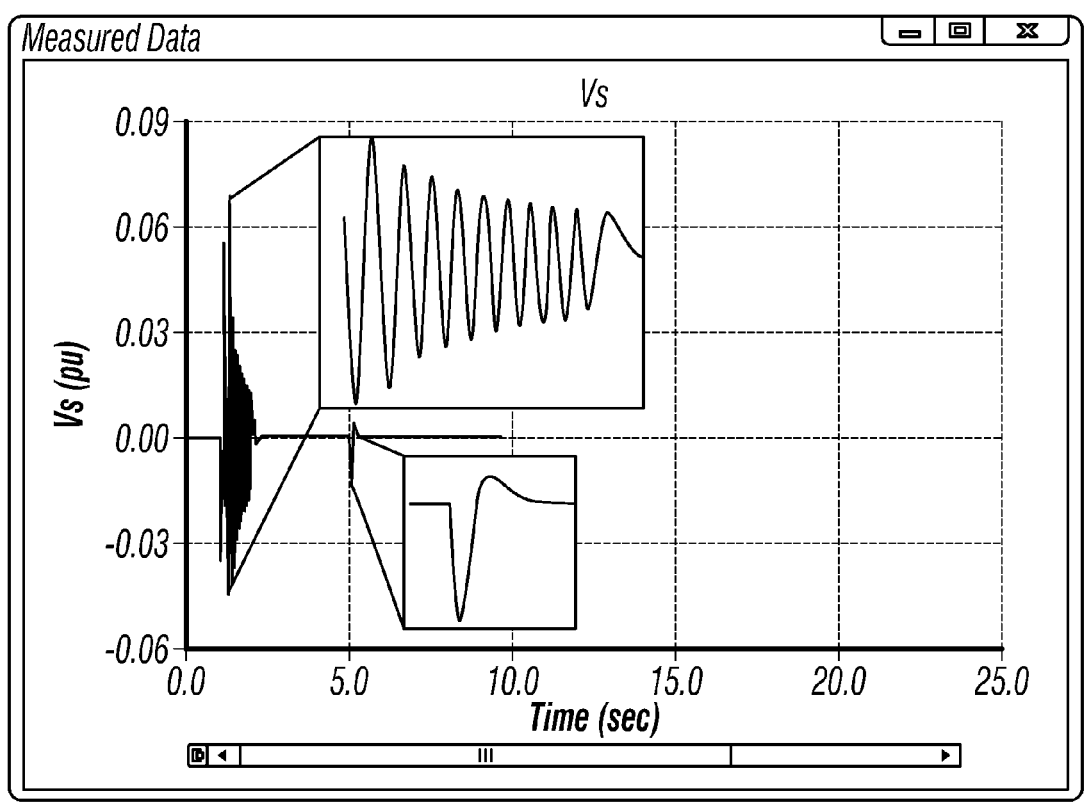
Figure 18A:
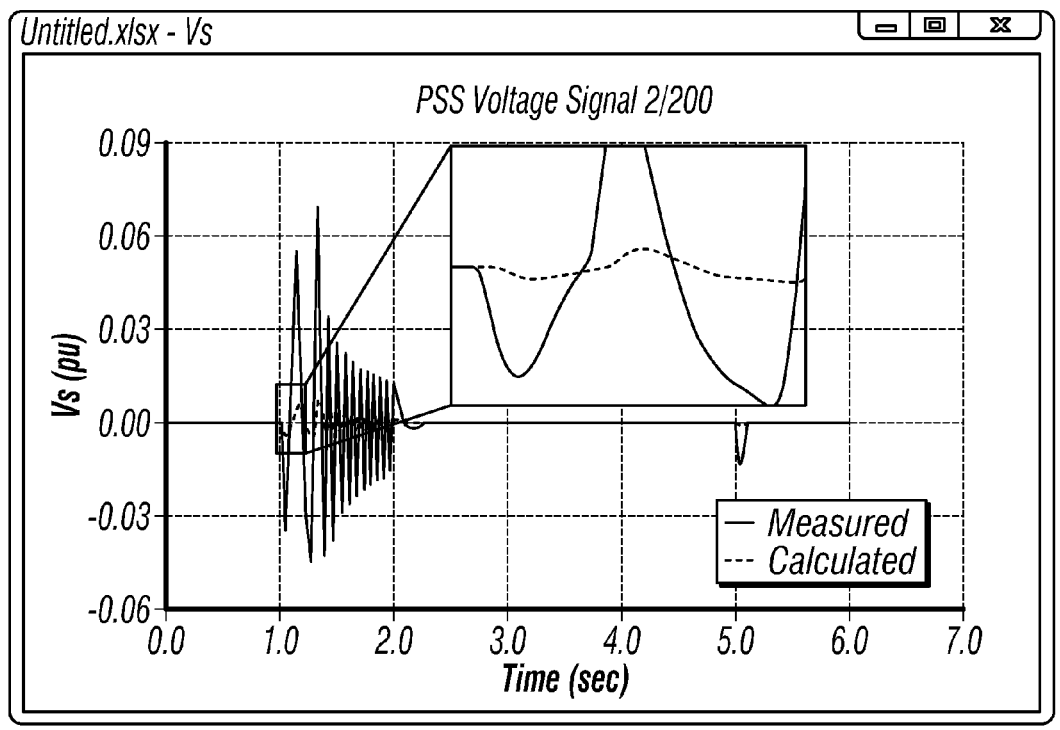
Figure 18B:
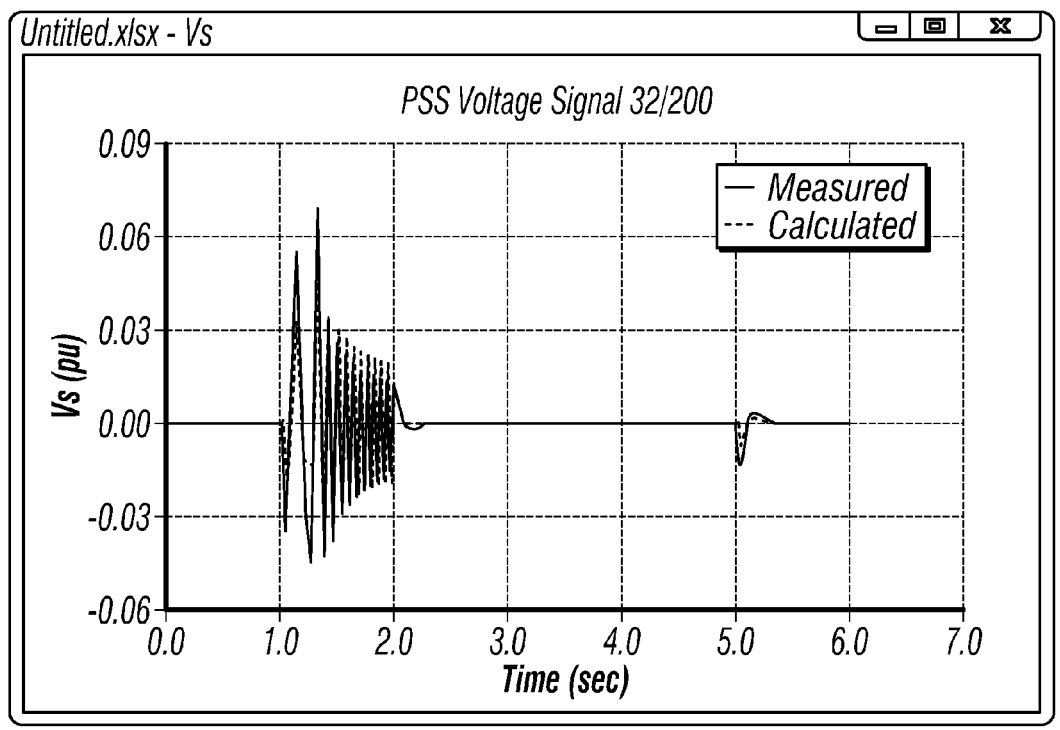
Figure 18C:
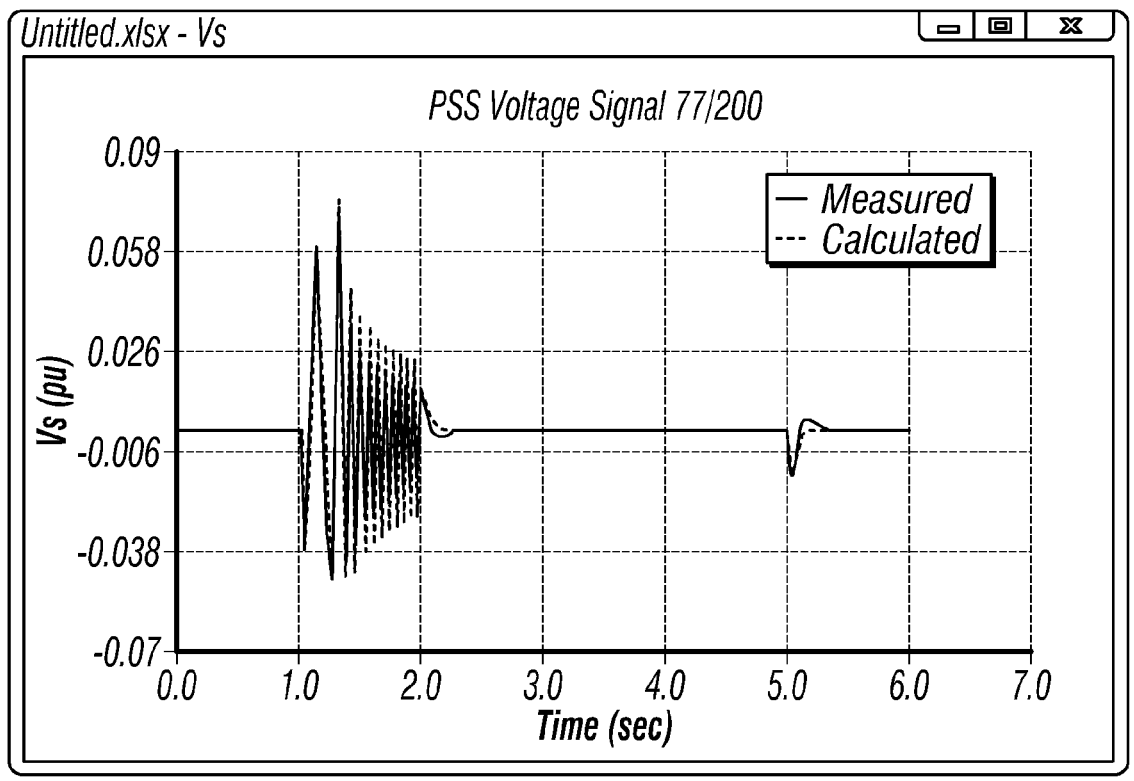
Figure 18D:
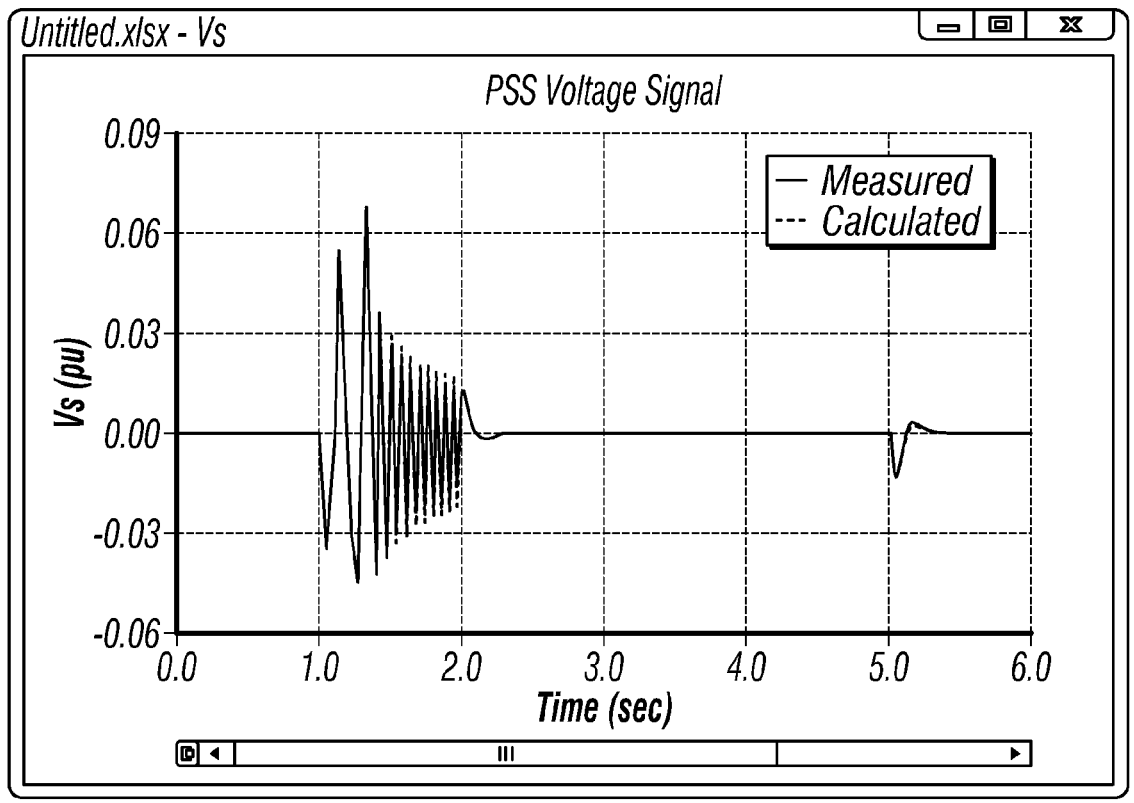

FIGS. 17A-17C illustrate recorded data associated with the simulation of a model according to FIG. 16.

FIGS. 18A-18D illustrate exemplary responses after different iterations of simulations with the model depicted in FIG. 16.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DETAILED DESCRIPTION

Embodiments disclosed herein are directed to methods and systems for dynamic parameter tuning. The present embodiments can be applied in generators, exciters, governors, power system stabilizers, wind turbines, electrical machines, FACTS devices, and controllers.

Dynamic parameter tuning (DPT) is a constraint optimization problem to find the best set of tuned parameter values to match with given field-measured data. An intelligent optimization method is required to come up with the optimal or near optimal values of parameters to reduce deviation between measured field data and calculated outputs. Automatic DPT adds an additional new layer in time saving capabilities, saving hundreds of engineering man-hours spent on the tedious process of model validation and parameter tuning. Parameter tuning of a power system network is very important for modeling, simulation, control and protection because it affects many power system studies, e.g., transient stability, voltage distortion, relay setting and so on. Thus it is recommended to tune parameters over time for more accurate power system analysis results.

Applications of DPT include tuning and validating dynamic control elements of generic dynamic models. This includes but is not limited to following exemplary types of controllers or dynamic models:

1) Synchronous Motors Exciter/AVR models;
2) Synchronous Generator Exciter/AVR models;
3) Synchronous Generator Turbine, Engine/Speed Control models;
4) Synchronous Generator PSS (Power System Stabilizer) models;
5) Wind Turbine Generator Models;
6) Generic Load Models (Lumped Load Element Dynamic Models).

The embodiments disclosed herein directed to DPT using MPSO can be applied in generators, exciters, governors, power system stabilizers, wind turbines, electrical machines, FACTS devices, and controllers. The embodiments described herein are generic, robust and they always converge. The embodiments described herein play an important role for modeling better power systems and help to simulate and build smarter grid.

Figure 1:
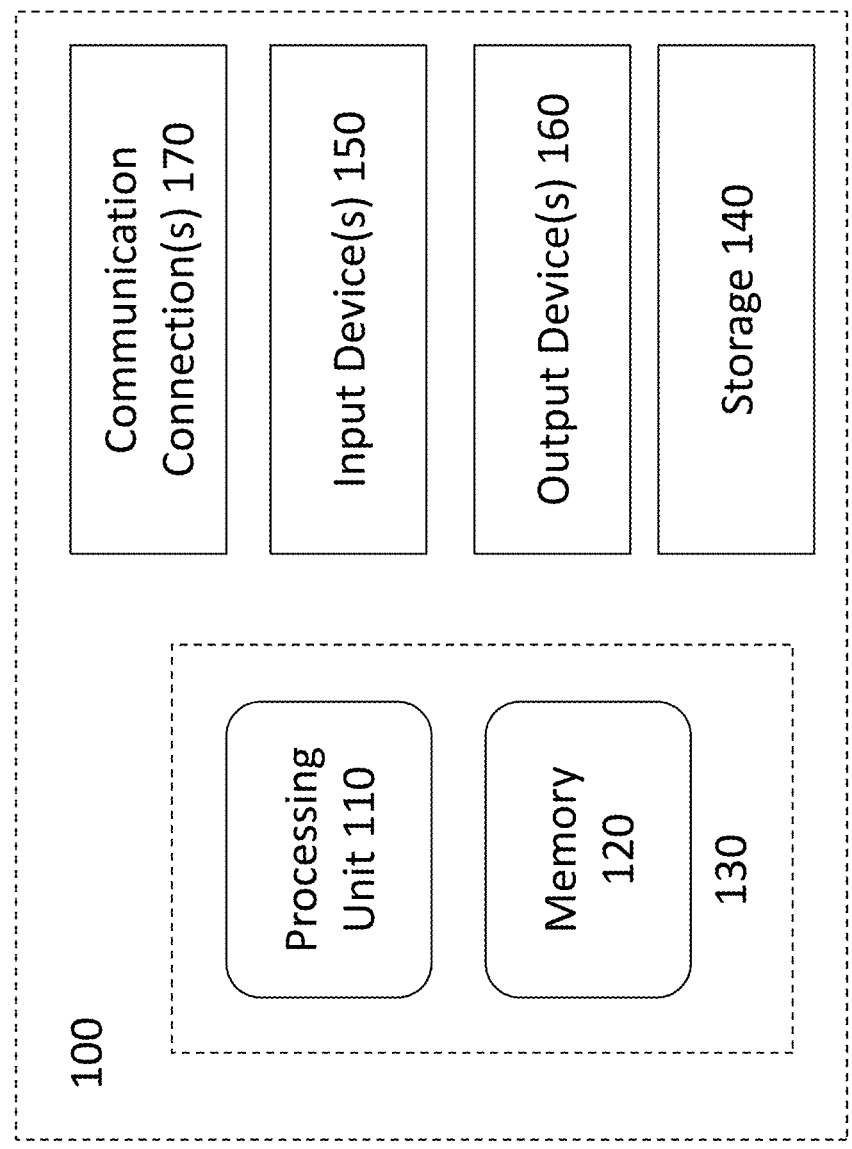
FIG. 1 illustrates an exemplary controller for use with the present system, according to one embodiment.

FIG. 1 illustrates an exemplary controller for use with the present system, according to one embodiment. The controller is not intended to suggest any limitation as to scope of use or functionality, as the technologies described herein may be implemented in diverse general-purpose or special purpose computing environments. With reference to FIG. 1, the controller 100 can include at least one processing unit 110 (e.g. signal processor, microprocessor, ASIC, or other control and processing logic circuitry) coupled to memory 120. The processing unit 110 executes computer-executable instructions and may be a real or a virtual processor. The memory 120 may be volatile memory (e.g. registers, cache, RAM), non-volatile memory (e.g. ROM, EEPROM, flash memory, etc.), or some combination of the two. The memory 120 can store software implementing any of the technologies described herein. The controller may have additional features. For example, the controller can include storage 140, one or more input devices 150, one or more output devices 160, and one or more communication connections 170. An interconnection mechanism (not shown), such as a bus or network interconnects the components. Typically, operating system software (not shown) provides an operating environment for other software executing in the controller and coordinates activities of the components of the controller.

The storage 140 may be removable or non-removable, and can include magnetic disks, magnetic tapes or cassettes, CD-ROMs, CD-RWs, DVDs, or any other computer-readable media that can be used to store information and which can be accessed within the controller. The storage 140 can store software containing instructions for controlling systems described herein.

The input device(s) 150 can be a touch input device such as a keyboard, mouse, pen, or trackball, a voice input device, a scanning device, or another device. The output device(s) 160 may be a display, printer, speaker, CD- or DVD-writer, or another device that provides output from the controller. Some input/output devices, such as a touch screen, may include both input and output functionality.

The communication connection(s) 170 enables communication over a communication mechanism to another computing entity. The communication mechanism conveys information such as computer-executable instructions, audio/video or other information, or other data. By way of example, and not limitation, communication mechanisms include wired or wireless techniques implemented with an electrical, optical, RF, microwaves, infrared, acoustic, or other carrier.

Figure 2:
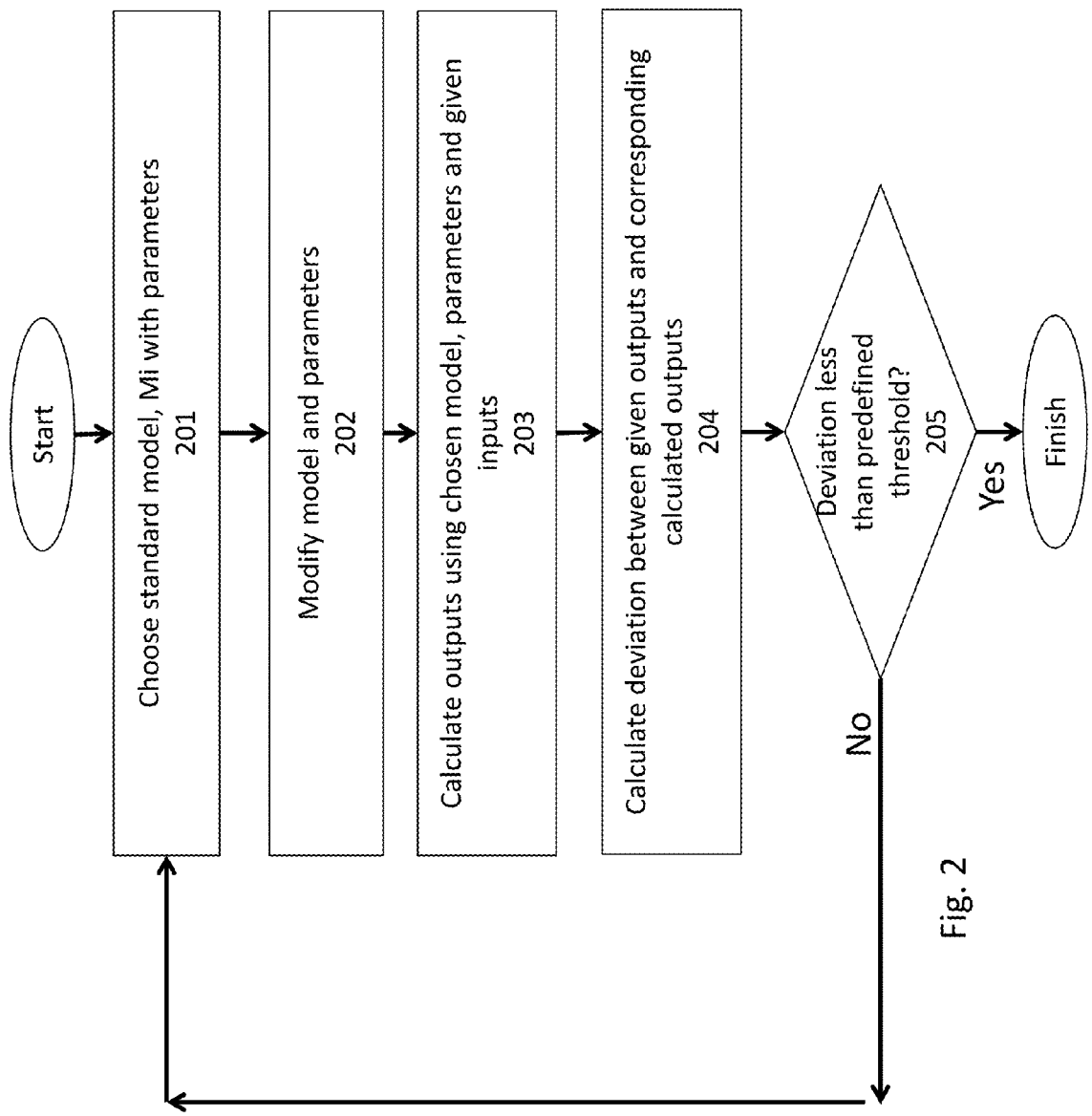
FIG. 2 illustrates an exemplary dynamic parameter identification (DPI) process flow.

FIG. 2 illustrates an exemplary dynamic parameter identification (DPI) process flow. DPI is a process for identifying parameters where models are variable and DPI is used when a model is unknown. A standard model, Mi, is chosen along with parameters 201. The model and parameters are modified 202. Outputs are calculated using the chosen model, parameters, and given inputs 203. A deviation between given outputs and corresponding calculated outputs is calculated

204. If the deviation is less than a predefined threshold 205, then the process is complete. Otherwise the process continues back to 201.

Applications of DPI include identification of parameters of generic systems with multiple inputs and outputs, exciters, governors, stabilizers, wind turbine generators, inverters, chargers, UPS's, rotary UPS's, motors, generators, saturation limits, damping, and inertia.

Figure 3:
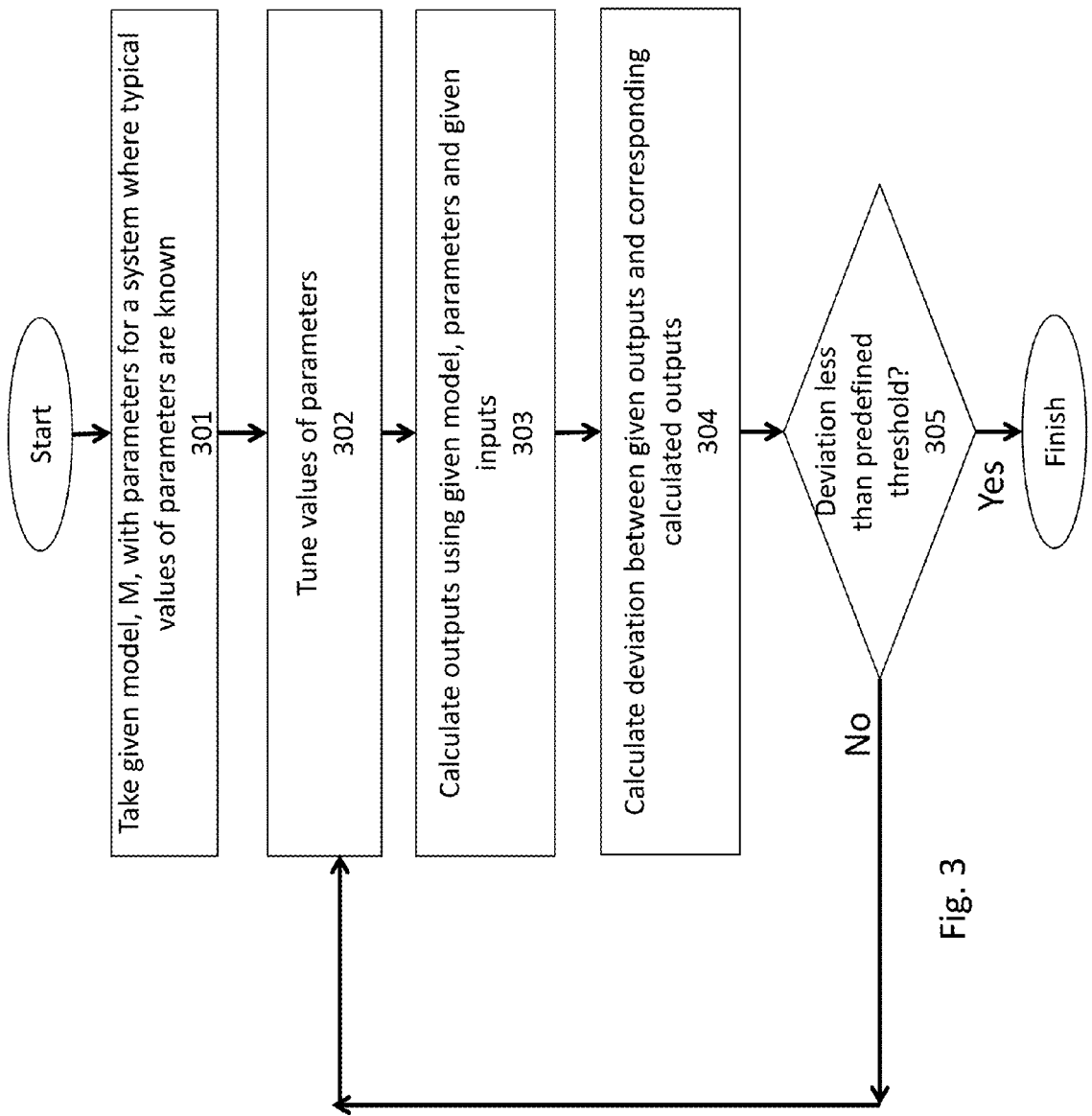
FIG. 3 illustrates an exemplary dynamic parameter tuning (DPT) process flow.

FIG. 3 illustrates an exemplary dynamic parameter tuning (DPT) process flow. DPT is a process to tune parameters where models are fixed. DPT is used when a model is known and typical values of the parameters of the model are also known. DPT is needed because in most cases, typical parameter values or values provided from manufactures do not match input and output perfectly and/or parameter may be changed over time. A given model, M, is taken with parameters for a system where typical values of parameters are known 301. The values of the parameters are tuned 302. Outputs are calculated using the given model, parameters, and given inputs 303. A deviation between given outputs and corresponding calculated outputs is calculated 304. If the deviation is less than a predefined threshold, 305, the process is complete. Otherwise the process returns to 302.

DPT is very important in power industry for the following reasons:

Manufacturer parameter data may not be available or suitable for every system;

Dynamic parameters have high impact on the quality of system analysis;

Systems are highly non-linear complex models;

Results are very sensitive to parameters;

Verification and validation are not simple; and

DPT is a requirement of reliable power operations in modern power systems.

Applications of DPT include tuning parameters of generic systems with multiple inputs and outputs, exciters, governors, stabilizers, wind turbine generators, inverters, chargers, UPS's, rotary UPS's, motors, generators, saturation limits, dampings, inertia, and networks consisting of generators, exciters, governors, PSS, power networks, load and so on.

Figure 4:
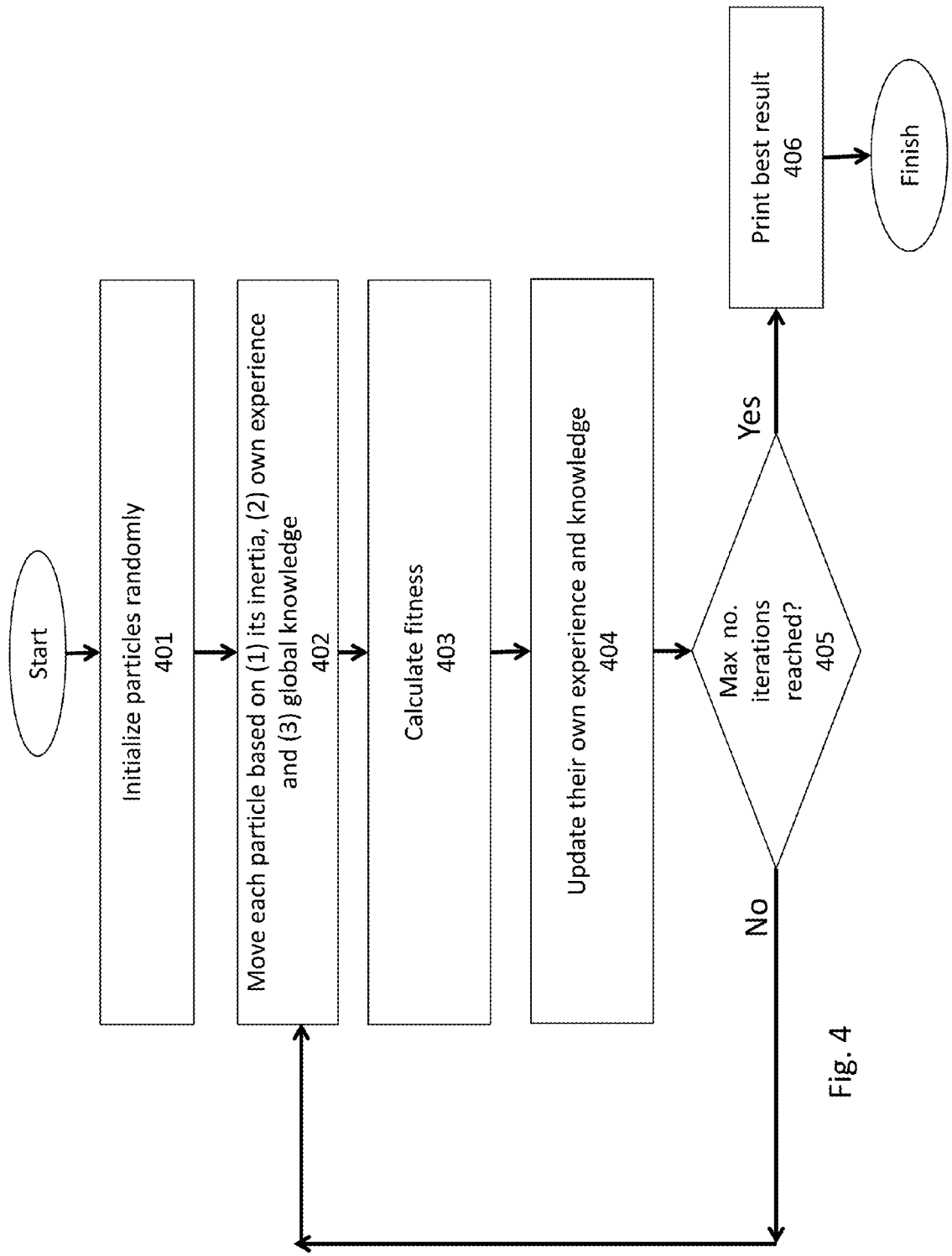
FIG. 4 illustrates an exemplary particle swarm optimization (PSO) process flow.

FIG. 4 illustrates an exemplary particle swarm optimization (PSO) process flow. PSO is a bio-inspired swarm based stochastic algorithm based on the behavior of flocks of birds and schools of fish, and has similarities to other population based evolutionary algorithms. Basic equations of PSO are:

$$v_{ij}(k+1) = v_{ij}(k) + c_1 * \text{rand}_1 * (pbest_{ij}(k) - x_{ij}(k)) + c_2 * \text{rand}_2 * (gbest_j(k) - x_{ij}(k)) \quad (1)$$

$$x_{ij}(k+1) = x_{ij}(k) + v_{ij}(k+1) \quad (2)$$

At each generation, PSO changes the velocity and location of each particle toward its pbest location depending on memory and gbest location depending on knowledge according to (1) and (2), respectively. A particle's best location is referred to as experience, and the best location of all the particles of the swarm is referred to as knowledge.

In the above velocity equation (1), the first term indicates inertia of the particle; the second term presents the cognitive part of the particle; and the third term is the social part of PSO.

Referring to FIG. 4, particles are initialized randomly 401. Each particle is moved based on (1) its inertia, (2) own experience, and (3) global knowledge 402. Fitness is calculated 403, and each particle's experience and knowledge is updated 404. Once a maximum number of iterations has been reached 405, the best result is printed 406 and the process is complete. Otherwise the process returns to 402.

Some applications of PSO include Economic Load Dispatch, Unit Commitment, Real Power and Voltage Control, State Estimation, Optimum Power Flow, System Identification and Intelligent Control, Network Reconfigurations, General Maintenance Scheduling, Optimum Capacitor Placement, Shortest route Calculation, and PSS Parameter Tuning.

Figure 5:
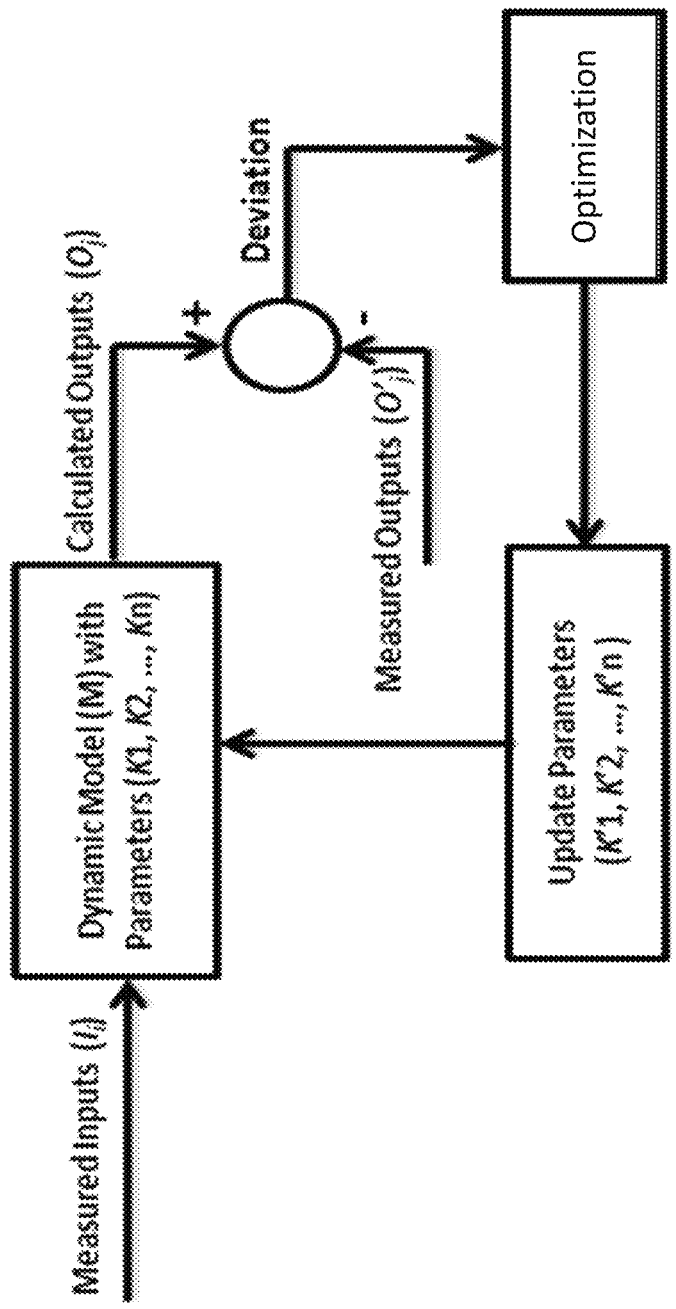
FIG. 5 illustrates an exemplary model for typical dynamic parameter tuning (DPT).

FIG. 5 illustrates an exemplary model for typical dynamic parameter tuning (DPT). Inputs for the exemplary DPT model include specific or fixed models/functions (M), measured inputs (Ii) and measured outputs (Oi) from field data points or curves of the models/functions, and typical values of the dynamic parameters (K1, K2, . . . , Kn) from experience or manufacturers. Outputs from the exemplary optimization engine include tuned parameter values (K'1, K'2, . . . , K'n) to fit the inputs and outputs more accurately. It is assumed in FIG. 5 that model and parameter names are known, however, exact parameter values are unknown. Exact parameter values are very important in generator control systems because some parameters are very sensitive. Correct parameter values may not be available from manufacturers and parameter values may also be de-rated over time.

Figure 6:
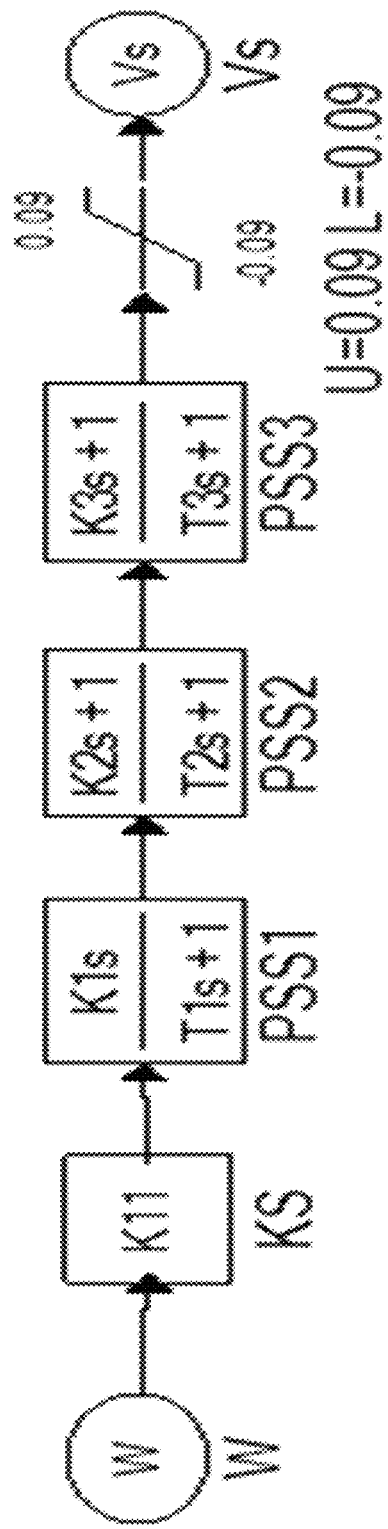
FIG. 6 illustrates an exemplary simplified IEEE power system stabilizer (PSS) model.
Figure 7:
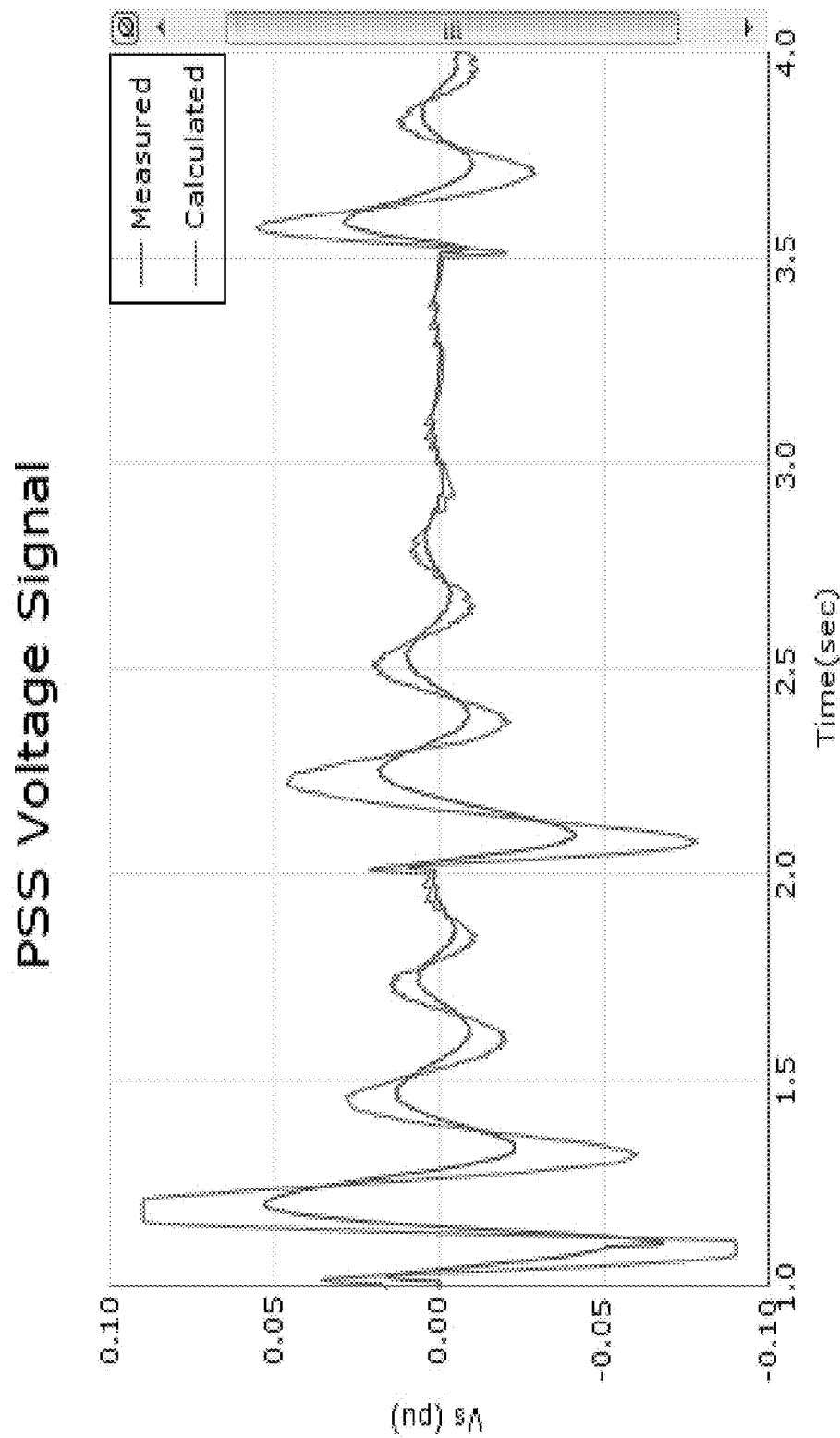
FIG. 7 illustrates a voltage-time plot for parameter effects corresponding to the PSS model illustrated in FIG. 6.

FIG. 6 illustrates an exemplary simplified IEEE power system stabilizer (PSS) model. FIG. 7 illustrates a voltage-time plot corresponding to the PSS model illustrated in FIG. 6. In the exemplary simplified IEEE PSS model, if time constants T2 and T3 are both assigned to 0.15 sec instead of actual value 0.1 sec, then a significant change in output signal Vs is visible in FIG. 7.

Figure 8A:
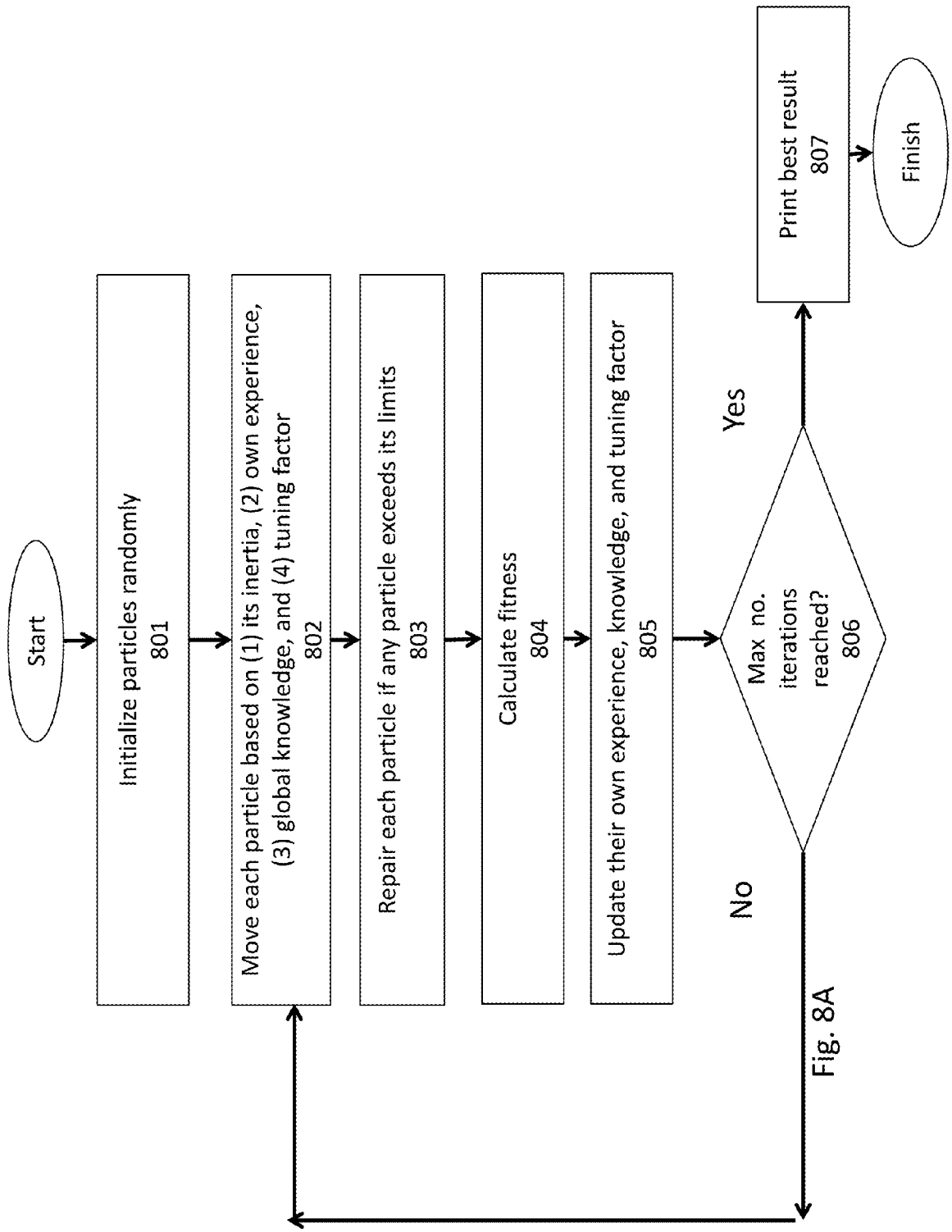
FIG. 8A illustrates an exemplary modified PSO (MPSO) process flow.

FIG. 8A illustrates an exemplary modified PSO (MPSO) for use with the present system, according to one embodiment. According to one embodiment, MPSO is used to dynamically tune parameters. Depending on DPT problems, PSO needs to be modified for quick convergence and better results. DPT is a complex constraint optimization problem and thus the present embodiments introduce a tuning factor for more precise local search at the end in the modified PSO to better balance local and global searches as described below.

Referring to FIG. 8A, particles are initialized randomly 801, and each particle is moved based on its (1) inertia, (2) experience, (3) global knowledge, and (4) tuning factor 802. Each particle is repaired if it exceeds any limit 803. Fitness is calculated 804 and each particle's knowledge, experience, and tuning factor are updated 805. Once a maximum number of iterations has been reached 806, the best result is printed 807 and the process is complete. Otherwise the process returns to 802.

Advantages to using MPSO in DPT include the following:

(i) optimizing or tuning a wide range of both integer and real type model parameters (decision/state variables);

(ii) handling of constraints/limits/saturations in the dynamic model;

(iii) handling of general multi-input/multi-output dynamic systems;

(iv) MPSO is not limited to any non-concave functions, order of functions, non-differentiable functions of the dynamic models;

(v) MPSO has balance between local and global search abilities for the fine tuning of model parameters;

(vi) MPSO has information sharing mechanisms of model parameters;

(vii) MPSO can be implemented in multi-objective strategy;

(viii) parameters in MPSO method can be solved in parallel platform and MPSO has been utilized in modern multi-core processing facilities;

(ix) MPSO can handle both scalar and complex data of a power network;

(x) MPSO can handle noisy data from field measurements; and (xi) MPSO is fast, robust, and is easy to implement.

According to one embodiment, the present system includes a modified PSO for DPT as below:

$$w = 1.0 - 0.9 * k / MaxIte + rand_3 \quad (3)$$

$$v_{ij}(k+1) = w * v_{ij}(k) + c_1 * rand_1 * (pbest_{ij}(k) - x_{ij}(k)) + c_2 * rand_2 * (gbest_j(k) - x_{ij}(k)) \quad (4)$$

$$\left.\begin{array}{l} x_{ij}(k+1) = x_{ij}(k) + v_{ij}(k+1) \quad \text{if } k < MaxIte/2 \\ x_{ij}(k+1) = x_{ij}(k) + BF * v_{ij}(k+1) \quad \text{if } k \geq MaxIte/2 \end{array}\right\} \quad (5)$$

$$BF = 0.15 / w \quad (6)$$

Where:
$rand_1$=random (0, 1)
$rand_2$=random (0, 1)
$rand_3$=random (−0.01, 0.01)
BF=Balancing Factor
$pbest_{ij}$=Local best of a particle i for dimention j
$gbest_j$=Global best of all the particles for domention j
k=Current iteration
MaxIte=Maximum number of iterations In modified PSO for parameter tuning as disclosed herein, inertia is improved in (3) and a balancing factor (also referred to herein as tuning factor) is added in (5) in the second half of the iterations. Some constants are used for inertia weight, w in (3) and balancing factor BF in (6) from experience, which are ideal for dynamic parameter estimation applications.

Fitness plays an important role for the convergence of dynamic parameter tuning (DPT). Formulating DPT as a minimization problem where the objective is to minimize total deviation over entire available time domain sequential data takes care of all available data points. Therefore both steady state and transient of field recorded measured data and calculated data match closely. A fitness value for the objective is calculated as below:

$$\text{Fitness} = \sum_{i=1}^{MaxData} |\text{Measured\_Output}_i - \text{Calculated\_Output}_i| \quad (7)$$

Tunable parameters are state variables in DPT. Some parameters can be fixed as users may already know those parameters' values. At each iteration, modified PSO as disclosed herein generates a tentative solution for tunable parameters. Those parameter values and input data of the dynamic model from field are used to generate calculated outputs of dynamic model sequentially at every time step. Then the fitness is the total absolute difference of the field-measured outputs and calculated outputs over the entire study period.

According to one embodiment, handling of saturation parameters includes a direct repair. If a particle's position exceeds a saturation limit, the particle is forced to come back inside the saturation limits. Velocity and direction are also changed so that next time the particle will move under the valid saturation limits. This method generates a feasible solution from an infeasible solution. Pseudo code of direct repair to handle saturation parameters, according to one embodiment, is shown below:

```
// Max limit checking
if ( x[i][j] > MaxSaturationLimit[j] )
{
    if ( ParticleMaxSaturationLimitHit[i][j] = false)
    {
        x[i][j] = MaxSaturationLimit[j]
        ParticleMaxSaturationLimitHit[i][j] = true
    }
    else
    {
        x[i][j] = random( MinSaturationLimit[j],
        MaxSaturationLimit[j] )
        V[i][j] = − V[i][j]/2.0
        ParticleMaxSaturationLimitHit[i][j] = false
    }
}
// Min limit checking
if ( x[i][j] < MinSaturationLimit[j] )
{
    if ( ParticleMinSaturationLimitHit[i][j] = false)
    {
        x[i][j] = MinSaturationLimit[j]
        ParticleMinSaturationLimitHit[i][j] = true
    }
    else
    {
        x[i][j] = random(MinSaturationLimit[j],
        MaxSaturationLimit[j] )
        V[i][j] = − V[i][j]/2.0
        ParticleMinSaturationLimitHit[i][j] = false
    }
}
```

According to one embodiment, the direct repair method is applied for constraints of other parameters, e.g., time constant and gain.

DPT involves time domain sequential calculations. Measured data is needed at every instant of time that is an integer multiple of a simulation time step. However, depending on precision or sampling rate, measured data may not be available for every desired instant of time. Interpolation or extrapolation is performed to estimate data at a desired instant of time.

Figure 8B:
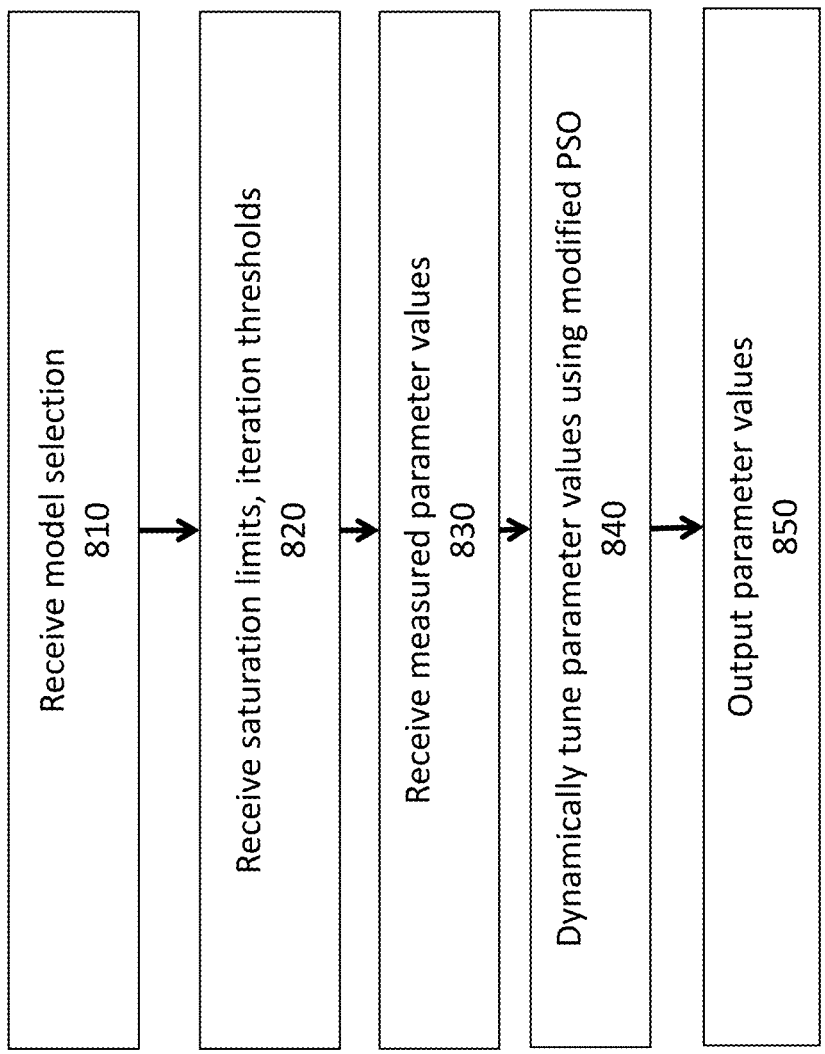
FIG. 8B illustrates an exemplary parameter tuning process for use with the present system, according to one embodiment.

FIG. 8B illustrates an exemplary parameter tuning process for use with the present system, according to one embodiment. An apparatus implementing the present technology receives a model selection input 810, and receives defined saturation limits, iteration thresholds, and any other definitions necessary for tuning calculations 820. Measure parameter values or field data are received 830, and then parameter values are dynamically tuned using modified PSO as described herein 840. Tuned parameters values are then output 850.

Figure 9B:
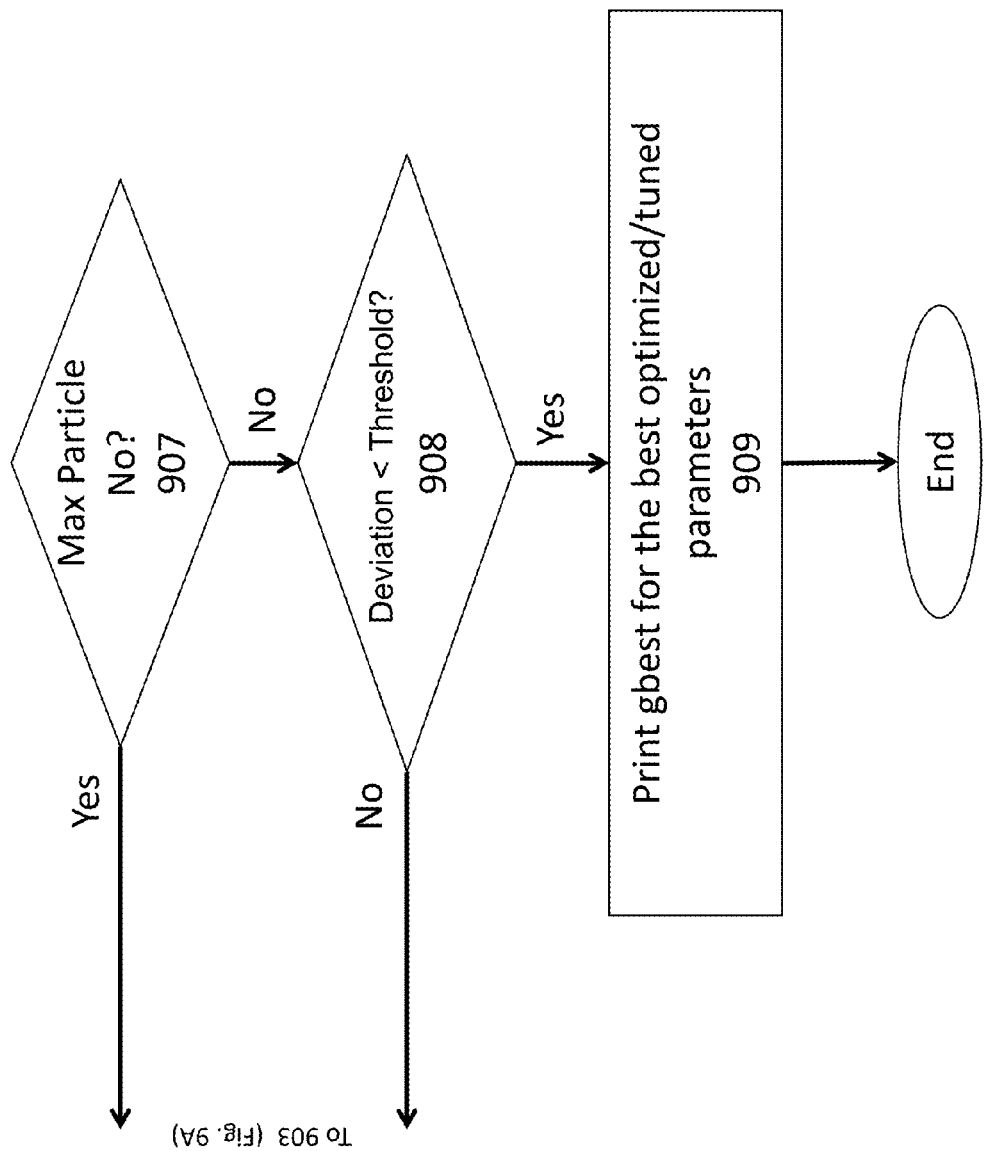

FIG. 9 illustrates an exemplary DPT calculation process using MPSO for use with the present system, according to one embodiment. The proposed process updates its particle solution after calculating all the output data for an entire time period (typically seconds or minutes). In online and real-time applications, the proposed method updates parameters when any transient data comes from the field. The proposed method can handle any number of objectives and constraints of the dynamic model.

It is assumed that the dynamic model (model type, blocks, connections, inputs and outputs) is known. Therefore the process builds the dynamic model 901 with proper parameters where some or all parameter values are unknown.

Particles are problem solving agents for PSO. According to one embodiment, the present process takes a suitable number of particles depending on the problem complexity (as an example, generally twenty is recommended). Dimensions of each particle contribute to the number of parameters of the dynamic model. Each particle is initialized 902 by its typical value+Random(−Limit, Limit). Exemplary sources of typical values are manufacturers or similar type of known models or practical experiences. Large values are assigned for pbest, gbest and fitness.

Velocity and position are updated 903 depending on a particle's experience and other particles' knowledge. In this way, the PSO method shares information. Dynamic model changes its internal states at every time step during transient. However, internal states are fixed once the model goes to a steady state.

As the model is known and already initialized, all time domain outputs over the entire simulation time can be calculated 904 for all given inputs sequentially considering time step.

Calculated outputs are available from the model for a set of parameter values. Fitness is calculated 905 as a total deviation of calculated and measured outputs. Maximum deviation at any instant of time as well as average deviations are calculated 905 from all time domain measured and calculated outputs. The process stops if desired maximum and/or average deviations are reached. If current fitness of a particle is less than all of its previous fitness calculations, pbest is updated to its current fitness 906. Also, if current fitness of a particle is the least of all particles, gbest is updated to the least fitness 906. The process also stops when a maximum number of iterations 908 is reached or the desired maximum and/or average deviation 907 is achieved. Upon exiting the present process, gbest is printed for the best optimized or tuned parameters 909.

Simulation of exemplary embodiments of the methods disclosed herein yielded results as discussed below.

FIG. 10 illustrates an exemplary ST type governor used for simulation, according to one embodiment. FIG. 11 illustrates exemplary speed over time for the exemplary ST type governor depicted in FIG. 10. FIG. 12 illustrates a comparison of mechanical power output for the exemplary ST type governor depicted in FIG. 10.

In a first case of simulation, an ST type governor is used for simulation and speed and mechanical power data are generated using ETAP. Speed data is collected from ETAP for 5 sec and 1 ms time step, resulting in a total of 5000 data points considered for simulation in the ST type governor. The proposed method tunes the parameters of ST type governor accurately, the values can be reviewed in Table I. Typical values of parameters for an ST type governor are considered as initial values in the present MPSO method. A sufficiently large range is considered as search space for each parameter so that the optimum values are not skipped. For example, a typical value of the control amplifier (servomotor) time constant, Tc, is 100 ms where the limit is 0 to 200 ms. The MPSO method as disclosed herein generates 50.7 ms for the given field input and output data.

Mechanical power output comparison is shown in FIG. 12 where the deviation (error) is tolerable. Typical droop is 5%; however, tuned droop is 10% in Table I and thus other parameters are also changed to minimize error accordingly. Total absolute error for 5,000 points is only 0.1386 which is acceptable for power system parameter tuning.

TABLE I

Typical and tuned values of ST governor parameters

| Parameter | Initial/Typical Value | Limit | Tuned Parameter |
|---|---|---|---|
| Fhp (pu) | 0.70 | 0-1.0 | 0.7141 |
| Tsr (sec) | 0.10 | 0-0.2 | 0.2000 |
| Tc (sec) | 0.10 | 0-0.2 | 0.0507 |
| Tch (sec) | 0.15 | 0-1.0 | 0.0507 |
| Trh (sec) | 5.0 | 0-10 | 10.000 |
| Droop (%) | 5.0 | 0-10 | 10.000 |
| Pmax (MW) | 8.333 | Fixed | — |
| Pmin (MW) | 0 | Fixed | — |
| Total abs. deviation | | 0.1386 | |

Where:
Fhp (Shaft capacity ahead of reheater)/(Total shaft capacity);
Tsr Speed relay time constant;
Tc Control Amplifier (servomotor) time constant;
Tch Steam chest time constant;
Trh Reheater time constant;
Droop Steady-state speed droop;
Pmax Maximum shaft power (rated MW); and
Pmin Minimum shaft power (>=0).

FIG. 13 illustrates an IEEE type AC2A exciter used for simulation, according to one embodiment. FIG. 14 illustrates Vt for the exemplary IEEE type AC2A exciter illustrated in FIG. 13. FIG. 15 illustrates Efd for the IEEE type AC2A exciter illustrated in FIG. 13.

In a second case of simulation, an IEEE type AC2A exciter is chosen for simulation because its size is moderate, it has saturation limits, it has sufficient number of tunable parameters and thus it is complex enough to test the proposed method. For testing, available input data are Vt, Efd and model (IEEE Type AC2A). Total simulation time is 6 sec and time step is 1 ms, resulting in a total number of 6,000 test data points. Typical and tuned values of parameters can be reviewed in Table II. Measured and calculated graphs for Efd overlap each other perfectly.

TABLE II

Typical and tuned values of IEEE Type AC2A exciter parameters

| Parameter | Initial/Typical Value | Limit | Tuned Parameter |
|---|---|---|---|
| VAmax | 8 | 0-20 | 7.271077 |
| VAmin | −8.0 | 0-12 | −6.739573 |
| VRmax | 105.0 | 50-120 | 120.000000 |
| VRmin | −95.0 | −195-0 | −122.57930 |
| VUEL | −150.0 | 0300-0 | −97.545231 |
| VOEL | 150 | 0-250 | 115.419180 |
| VFEmax | 4.4 | 1.0-8.0 | 3.668523 |
| E1 | 4.4 | 1.0-8.0 | 4.988201 |
| SE1 | 0.037 | 0.01-0.06 | 0.060000 |
| E2 | 3.3 | 1.0-6.0 | 2.916942 |
| SE2 | 0.012 | 0.001-0.1 | 0.020610 |
| KA | 400.0 | 100-600 | 338.943905 |
| KB | 25.0 | 1-50 | 29.132722 |
| KC | 0.28 | 0.01-5.0 | 0.331152 |
| KD | 0.35 | 0.01-5.0 | 0.367732 |
| KE | 1.0 | 0.01-10 | 0.747691 |
| KF | 0.03 | 0.01-3.0 | 0.037096 |
| KH | 1.0 | 0.01-50.0 | 1.002858 |
| TA | 0.01 | 0.0-5.0 | 0.027783 |
| TB | 0.0 | 0.0-5.0 | 0.475612 |
| TC | 0.0 | 0.0-5.0 | 0.485672 |
| TE | 0.6 | 0.001-5.0 | 0.657070 |
| TF | 1.0 | 0.0-5.0 | 1.000728 |
| TR | 0.0 | 0.0-5.0 | 0.002582 |
| Total abs. deviation | | | 10.9 |

FIG. 16 illustrates an IEEE PSS2B dual-input power system stabilizer used for simulation, according to one embodiment. In a third case of simulation, DPT of an IEEE PSS2B dual-input power system stabilizer model is explored, which typically uses power and speed to derive the stabilizing signal. The model transfer functions are displayed in FIG. 16. Inputs in FIG. 16 are the electrical power (Pe) and the speed (W) and the output is stabilizing voltage (Vs). For each input, two washouts exist (TW1 to TW4) along with a transducer or integrator time constants (T6, T7).

Input and output data are collected from ETAP transient stability program in a study of a 3-phase fault at 1st sec for 0.1 sec at a close bus followed by a 1236 kVA load shedding at 5th sec. Total data is collected for 30 sec and sampling rate is 1.0 ms because it takes long time to stable. However, transients are occurred at 1st 5th seconds. In this study, ST4B exciter is connected to the generator that can work perfectly with the PSS type IEEE PSS2B.

FIGS. 17A-17C illustrate recorded data associated with the simulation of a model according to FIG. 16. Inputs are electrical power (Pe) and speed (W) which are shown in FIGS. 17A and 17B. Output is stabilizing voltage (Vs) which is shown in FIG. 17C. Note that, sometime field measured data might be available for a long period of time (e.g., 500 sec); however, it is not necessary to use entire data for tuning because it is slow. A portion of the data is enough; however, the data must have sufficient transients to tune the parameters.

TABLE III

Tunable parameters of IEEE PSS2B and typical values

| Block Name | Parameter Name | Typical Value (pu) | Tunable? |
|---|---|---|---|
| Wash-Tw1 | Tw1 | 10.0 | Yes |
| Wash-Tw2 | Tw2 | 10.0 | Yes |
| Wash-Tw3 | Tw3 | 10.0 | Yes |
| Wash-Tw4 | Tw4 | 0.0 | Yes |
| Trans Func1 | KS2 | 0.99 | Yes |
| | T7 | 10.0 | Yes |
| Trans Func2 | T6 | 0.0 | Yes |
| Gain-KS3 | KS3 | 1.0 | Yes |
| Ramp | T8 | 0.5 | Yes |
| | T9 | 0.1 | Yes |
| Gain-KS1 | KS1 | 20.0 | Yes |
| LeadLag1_2 | T1 | 0.15 | Yes |
| | T2 | 0.025 | Yes |
| LeadLag3_4 | T3 | 0.15 | Yes |
| | T4 | 0.02 | Yes |
| LeadLag10_11 | T10 | 0.0 | Yes |
| | T11 | 0.033 | Yes |
| VsInMaxMin | Pe_max | 2.0 | No |
| | Pe_min | −2.0 | No |
| VsOutMaxMin | Vs_max1 | 0.1 | No |
| | Vs_min1 | −0.1 | No |

FIGS. 18A-18D illustrate exemplary responses after different iterations of simulations with the model depicted in FIG. 16. Results at 2nd iteration (FIG. 18A), 32nd iteration (FIG. 18B), 77th iteration (FIG. 18C), and 200th iteration (FIG. 18D) are shown. Initially deviation is very large using typical values of the parameters. Even in the beginning, calculated output does not catch the train of the measured output well. However, at the 19th iteration, calculated output catches the train of the measured output; though, deviation is significant at the beginning of the transients and not acceptable for reliable power systems operation or compliances. At 77th iteration, calculated output overlaps the measured output, with some exceptions. This may be acceptable for reliable power systems operation or compliances. At the final iteration (out of 200), calculated and measured outputs match perfectly, which was desired (with the exception of some peak points only due to noise; this is acceptable). This result is a perfect fine tuning process using modified PSO as initially it converges fast and at the final stage it converges slowly not to miss local minima. Plots up to only 6 sec are shown because there is no transient after 6 sec and the system is steady state there.

TABLE IV

Tuned parameters of IEEE PSS2B

| Block Name | Parameter Name | Typical Value (pu) | Limit | Tunable? | Tuned Value |
|---|---|---|---|---|---|
| Wash-Tw1 | Tw1 | 10.0 | 5.0-50.0 | Yes | 6.040 |
| Wash-Tw2 | Tw2 | 10.0 | 5.0-50 | Yes | 7.440 |
| Wash-Tw3 | Tw3 | 10.0 | 5.0-50 | Yes | 10.520 |
| Wash-Tw4 | Tw4 | 0.0 | 0.0-0.01 | Yes | 0.011 |
| Trans Func1 | KS2 | 0.99 | 0.099-9.9 | Yes | 0.726 |
| | T7 | 10.0 | 0.2-20 | Yes | 20.050 |
| Trans Func2 | T6 | 0.0 | 000.001 | Yes | 0.00 |
| Gain-KS3 | KS3 | 1.0 | 0.1-10 | Yes | 1.079 |
| Ramp | T8 | 0.5 | 0.05-5.0 | Yes | 0.394 |
| | T9 | 0.1 | 0.05-0.3 | Yes | 0.100 |
| Gain-KS1 | KS1 | 20.0 | 10.0-40.0 | Yes | 20.214 |
| LeadLag1_2 | T1 | 0.15 | 0.01-0.3 | Yes | 0.152 |
| | T2 | 0.025 | 0.015-0.05 | Yes | 0.040 |
| LeadLag3_4 | T3 | 0.15 | 0.015-0.5 | Yes | 0.141 |
| | T4 | 0.02 | 0.01-0.05 | Yes | 0.042 |
| LeadLag10_11 | T10 | 0.0 | 0-0.01 | Yes | 0 |
| | T11 | 0.033 | 0.003-0.05 | Yes | 0.033 |
| VsInMaxMin | Pe_max | 2.0 | Fixed | No | Fixed |
| | Pe_min | −2.0 | Fixed | No | Fixed |
| VsOutMaxMin | Vs_max1 | 0.1 | Fixed | No | Fixed |
| | Vs_min1 | −0.1 | Fixed | No | Fixed |

IEEE PSS2B is complex system and it has multiple feasible solutions. Table IV shows one set of tuned values of IEEE PSS2B parameters. Some tuned parameters are close to typical values; however, others are not. The disclosed method rejects infeasible values of the parameters and iterates to improve the parameters values until deviation is tolerable for an application.

The present method is for dynamic parameter tuning, and the algorithm works for known models including input-output data and comes up with values of the parameters.

The present method can optimize or tune a wide range of both integer and real model parameters (decision or state variables). Users can initialize parameters by typical values. The method takes longer to converge and/or solution quality will be affected if the parameters are started from unrealistic values.

The present method can handle constraints, limits, and saturations in the dynamic model efficiently. The method is not limited to use any non-convex models, saturation/limit control blocks, logic control blocks, higher order non-differentiable functions, close loop models, or references.

The present method can handle multi-input/multi-output dynamic systems. It has no limitations on number of inputs, number of outputs, number of parameters, number of blocks, or number of polynomial function orders. However, execution time and solution quality depends on complexity of models and number of parameters because in PSO particle dimension is the number of parameters or unknown.

The present method is not limited to any non-convex and discontinuous functions, order of control functions and non-differentiable functions of the dynamic models. It can be used for tuning of any exciter, governor, PSS, or network where inputs, output and model structure are known.

The present system enables a balance between local and global search abilities for the fine tuning of model parameters. Balance of local and global search is an important criteria for optimization. The proposed modified PSO performs a global search in the beginning to move fast using large steps. At the end, it performs local search using small steps so that a good solution is not missed. Moreover, randomness is included to skip from local minima. Thus it is a stochastic optimization for parameter tuning.

PSO has information sharing and conveying mechanism that helps to tune parameters of complex control systems efficiently. It can be implemented in multi-objective strategies to tune multi-objective models. A model may have more than one output and the present method can achieve all outputs as weighted aggregation or separately as multi-objective strategy.

For a complex model and a large number of parameters, DPT converges in the range of minutes. According to one embodiment of the present system, DPT using modified PSO can be solved in parallel platforms for each particle and can utilize modern multi-core processing facilities.

According to one embodiment of the present system, users can scan average error and/or max error during the optimization process and stop if desired minimum deviation is achieved.

According to one embodiment, the present system is used for online parameter tuning. The present system is fast and robust with respect to typical methods.

Disclosures of the following references are considered relevant to the present disclosure, and are hereby incorporated by reference in their entirety.

[1] R. Bhaskar, M. Crow, E. Ludwig, K. Erickson, K. Shah, "Nonlinear parameter estimation of excitation systems," IEEE Trans. on Power System, vol. 15, no. 4, pp. 1225-1231, November 2000.

[2] C. M. Liaw, et al., "Parameter estimation of excitation systems from sampled data", *IEEE Trans. on Automatic Control*, vol. 37, no. 5, 1992.

[3] J.-C. Wang, H.-D. Chiang, C.-T. Huang, Y.-T. Chen, C.-L. Chang, C.-Y. Huang, "Identification of excitation system models based on on-line digital measurements," *IEEE Trans. on Power Systems*, vol. 10, no. 3, 1995.

[4] C.-S. Liu, Y.-Y. Hsu, L.-H. Jeng, C.-J. Lm, C.-T. Huang, A. H. Liu, T.-H. Li, "Identification of exciter constants using a coherence function based weighted least squares approach," *IEEE Trans. Energy Conversion*, vol. 8, no. 3, 1993.

[5] E. B. S. Filho, A. M. N. Lima, C. B. Jacobina, "Parameter estimation for induction machines via non-linear least squares method," *Proc. Int. Conf. Industrial Electronics, Control and Instrumentation (IECON)*, 1991, vol. 1, pp. 639-643.

[6] J. C. Cepeda, J. L. Rueda and I. Erlich, "Identification of Dynamic Equivalents based on Heuristic Optimization for Smart Grid Applications," *WCCI 2012 IEEE World Congress on Computational Intelligence*, pp. 1204-1211, Jun. 10-15, 2012, Brisbane, Australia.

[7] R. Chen, W. Wu, H. Sun, and B. Zhang, "A two-level online parameter identification approach," IEEE PES General Meeting, Jul. 21-25, 2013, Vancouver, BC Canada.

[8] D. Wei, P. Zanchetta, and D. W. P. Thomas, "Identification of electrical parameters in a power network using genetic algorithms and transient measurements," *Proc. Power Electronics and Motion Control Conference (PEMC)*, 2008, pp. 1716-1721.

[9] Z. Al-Hamouz, H. N. Al-Duwaish, N. A. Al-Musabi, "Particle Swarm Optimization Sliding Mode Controller," US Patent, Pub. No. US 2011/0257800 A1, Oct. 20, 2011.

[10] J. Kennedy and R. C. Eberhart, "Particle swarm optimization," Proc. IEEE Int. Conf. on Neural Networks, pp. 1942-1948, Perth, Australia, 1995.

[11] J. Kennedy and R. C. Eberhart, "A discrete binary version of the particle swarm algorithm," Proc. of IEEE Conf. on Systems, Man, and Cybernetics, pp. 4104-4109, 1997.

[12] Y. Valle, G. K. Venayagamoorthy, S. Mohagheghi, J.-C. Hernandez, and R. G. Harley, "Particle swarm optimization: Basic concepts, variants and applications in Power Systems," IEEE Trans. Evolutionary Computation, vol. 12, no. 2, pp. 171-195, April 2008.

[13] Z.-L. Gaing, "Particle swarm optimization to solving the economic dispatch considering the generator constraints," IEEE Trans. Power Syst., vol. 18, no. 3, pp. 1187-1195, August 2003.

[14] A. Y. Saber, T. Senjyu, A. Yona, and T. Funabashi, "Unit commitment computation by fuzzy adaptive particle swarm optimization," IET Gen. Transm. Dist., vol. 1, no. 3, pp. 456-465, May 2007.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

Dynamic parameter tuning using particle swarm optimization has been disclosed. It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art.

What is claimed is:

1. A system for dynamically tuning parameters of at least one device coupled to an online electrical network, comprising:
a sensor coupled to the online electrical network and operable to measure parameter values and generate field measured data of the online electrical network;
a control unit comprising a processor; and
a system including the at least one device and coupled to the online electrical network for receiving updated parameter values tuned by the control unit;
wherein the control unit:
receives as input a model selection and parameter definitions, including saturation limits;
dynamically tunes a value for each parameter to an updated parameter value based on the field measured data by using a modified particle swarm optimization method, wherein the modified particle swarm optimization method comprises moving particle locations based on a particle's inertia, experience, global knowledge, and a tuning factor; and
outputs the dynamically tuned updated value for each parameter to the at least one device,
wherein the particle's inertia is calculated using an iteration based dynamic randomization factor, and
wherein parameter value tuning is performed as an iterative optimization process, where:
initial tuning is performed based on global searching using large steps,
later value tuning is based on local searching using small steps, and
global and local searching are balanced using the tuning factor by multiplying it by the particle's velocity, and
wherein the tuning factor is a ratio calculated based on an inversely proportional relationship with the particle's dynamically randomized inertia weight.

2. The system of claim 1, wherein the system for receiving updated parameter values tuned by the control unit is one of a controller, generator, exciter, governor, or power system stabilizer.

3. The system of claim 1, wherein the system for receiving updated parameter values tuned by the control unit is one of a load, a wind turbine, electrical machine, power grid, FACTS device, or electrical power system.

4. The system of claim 1, wherein each parameter value is one of gain, transfer function, integrator, derivative, time constant, limiter, saturation constant, dead zone, or delay.

5. A non-transitory computer readable medium having stored thereon a plurality of instructions for dynamically tuning parameters of at least one device coupled to an online electrical network, the instructions executable by a processor to perform:
receiving as input a model selection and parameter definitions, including saturation limits;
dynamically tuning a value for each parameter of a plurality of parameters to an updated parameter value based on field measured data from a sensor attached to an online electrical network by using a modified particle swarm optimization method, wherein the modified particle swarm optimization method comprises moving particle locations based on a particle's inertia, experience, global knowledge, and a tuning factor; and
outputting the dynamically tuned updated value for each parameter to at least one device coupled to the online electrical network,
wherein the particle's inertia is calculated using an iteration based dynamic randomization factor, and
wherein parameter value tuning is performed as an iterative optimization process, where:
initial tuning is performed based on global searching using large steps,
later value tuning is based on local searching using small steps, and global and local searching are balanced using the tuning factor by multiplying it by the particle's velocity, and
wherein the tuning factor is a ratio calculated based on an inversely proportional relationship with particle's dynamically randomized inertia weight.

6. The non-transitory computer readable medium of claim 5, wherein a particle is a solution of parameters.

7. The non-transitory computer readable medium of claim 5, wherein the modified particle swarm optimization method further comprises:
initializing a particle by assigning a value of a typical value added to a random number to the particle;
updating a velocity of the particle and a location of the particle based on the particle's inertia, experience, global knowledge, and a tuning factor;
calculating a fitness for the particle, wherein the fitness is a difference between a field measured output and a calculated output for parameter values associated with the particle;
updating the particle's experience and global knowledge if the fitness is better than a previous fitness calculation; and
outputting a best value upon confirmation that the fitness is below a defined threshold or a maximum number of iterations has been achieved.

8. The non-transitory computer readable medium of claim 5, wherein the non-transitory computer readable medium is incorporated in one of a controller, generator, exciter, governor, or power system stabilizer.

9. The non-transitory computer readable medium of claim 5, wherein each updated parameter value is output to one device of a load, a wind turbine, electrical machine, power grid, FACTS device, or electrical power system.

10. The non-transitory computer readable medium of claim 5, wherein each parameter value is one of gain, coefficients of transfer function, integrator, derivative, time constant, limiter, saturation constant, dead zone, or delay.

* * * * *